US009520922B2

(12) United States Patent
Chen et al.

(10) Patent No.: US 9,520,922 B2
(45) Date of Patent: Dec. 13, 2016

(54) DOWNLINK CHANNEL QUALITY INFORMATION ACQUISITION METHOD AND DEVICE

(71) Applicant: Huawei Technologies Co., Ltd., Shenzhen, Guangdong (CN)

(72) Inventors: Dageng Chen, Shenzhen (CN); Xiaoyan Bi, Shenzhen (CN); Jiayin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 14/491,590

(22) Filed: Sep. 19, 2014

(65) Prior Publication Data

US 2015/0009852 A1    Jan. 8, 2015

Related U.S. Application Data

(63) Continuation of application No. PCT/CN2012/085423, filed on Nov. 28, 2012.

(30) Foreign Application Priority Data

Mar. 20, 2012  (CN) .......................... 2012 1 0074496

(51) Int. Cl.
*H04B 7/02* (2006.01)
*H04B 7/06* (2006.01)

(52) U.S. Cl.
CPC ............ *H04B 7/024* (2013.01); *H04B 7/0632* (2013.01); *Y02B 60/50* (2013.01)

(58) Field of Classification Search
None
See application file for complete search history.

(56) References Cited

U.S. PATENT DOCUMENTS

2006/0135193 A1    6/2006  Ratasuk et al.
2009/0323545 A1*  12/2009  Zhou ................... H04B 7/0452
                                                            370/252

(Continued)

FOREIGN PATENT DOCUMENTS

CN    101207896 A    6/2008
CN    102111198 A    6/2011

(Continued)

OTHER PUBLICATIONS

"Multi-layered Rate Control for SIC-based CoMP," 3GPP TSG RAN WG1 Meeting #58bis, Miyazaki, Japan, R1-094178, $3^{rd}$ Generation Partnership Project, Valbonne, France (Oct. 12-16, 2009).

*Primary Examiner* — Min Jung
(74) *Attorney, Agent, or Firm* — Leydig, Voit & Mayer, Ltd.

(57) ABSTRACT

A downlink channel quality information acquisition method includes: a transmission node in a coordinated node set acquires the noise receiving power of a user equipment (UE11) and the interference power on the UE11 of a node in a non-coordinated set; the transmission node in the coordinated node set acquires, via the transmission node in the coordinated node set, an inter-user interference power during the multi-user scheduling and the effective signal receiving power of the UE11; the transmission node in the coordinated node set acquires the interference power on the UE11 of a non-transmission node in the coordinated set; calculating the ratio between the effective signal receiving power and the sum of an interference source power and the noise receiving power of the UE11, and using the ratio as the value of the downlink CQI between the transmission node and the UE11.

12 Claims, 7 Drawing Sheets

(56) References Cited

U.S. PATENT DOCUMENTS

| | | | |
|---|---|---|---|
| 2010/0034114 A1 | 2/2010 | Kim et al. | |
| 2010/0317355 A1 | 12/2010 | Zangi et al. | |
| 2012/0120841 A1* | 5/2012 | Pham | H04B 7/0632 370/252 |
| 2012/0320783 A1* | 12/2012 | Wu | H04B 7/0689 370/252 |
| 2013/0107916 A1* | 5/2013 | Liu | H04B 7/0452 375/219 |
| 2013/0114430 A1* | 5/2013 | Koivisto | H04B 7/024 370/252 |
| 2014/0192744 A1* | 7/2014 | Zhou | H04B 7/024 370/329 |
| 2015/0009852 A1 | 1/2015 | Chen et al. | |

FOREIGN PATENT DOCUMENTS

| | | |
|---|---|---|
| CN | 103326764 A | 9/2013 |
| EP | 2552032 A2 | 1/2013 |
| WO | WO 2011118978 A2 | 9/2011 |

* cited by examiner

DOWNLINK CHANNEL QUALITY INFORMATION ACQUISITION METHOD AND DEVICE

CROSS-REFERENCE TO RELATED APPLICATIONS

This application is a continuation of International Patent Application No. PCT/CN2012/085423, filed on Nov. 28, 2012, which claims priority to Chinese Patent Application No. 201210074496.8, filed on Mar. 20, 2012, both of which are hereby incorporated by reference in their entireties.

FIELD

The present invention relates to the field of wireless communication, and in particular to a method and device for obtaining downlink channel quality information.

BACKGROUND

In existing wireless communication systems, a link adaptation technology including adaptive modulation coding (Adaptive Modulation Coding, AMC) and hybrid automatic repeat-request (Hybrid Automatic Repeat-reQuest, HARQ) is applied widely. Core concepts of the link adaptation technology is that the quality of a wireless link is rapidly adapted with the AMC technology to improve spectrum efficiency and throughput of the system, and that a data lose due to a burst error is further reduced in conjunction with HARQ technology to further improve a reliability of a transmission.

An efficient implementation of the link adaptation efficiently depends on an accuracy and efficiency of obtained link (or channel) status information. A process of obtaining channel status information (Channel Status Information, CSI) in the existing systems includes obtaining an uplink CSI and obtaining a downlink CSI. Specifically, the uplink channel status information is detected by a certain signal sent from a base station on a network side to a terminal; and the downlink channel status information is detected by a certain signal sent from the terminal to the base station on the network side and then the detected downlink channel status information is fed back to the network side.

Taking a downlink adaptation as an example, the terminal detects the downlink CSI in a preset period and feeds back the detected downlink CSI to the network side. Information fed back to the network side may include channel quality information (Channel Quality Information, CQI), a recommended precoding matrix indicator (Precoding Matrix Indicator, PMI), a recommended spatial multiplexing dimension (Rank Indication, RI) and the like. Specifically, the CQI is used by a schedule module for determining a resource allocation policy and selecting a modulation coding scheme (Modulation Coding Scheme, MCS), so as to determine an optimal MCS matching with a current quality of a channel. If a measured result of the CQI is large, i.e. the measured result is better than an actual channel quality, robustness (Robustness) of an employed MCS may decrease, which may result in an increased retransmission probability due to the loss of transmission data and a poor influence for effective throughput of the system. If the measured result of the CQI is small, i.e. the measured result is poorer than the actual channel quality, a rate is reduced unnecessarily and thus transmission efficiency and system throughput are reduced. Therefore, the measured result of the CQI is important for the system performance.

In existing wireless communication systems which take $3^{rd}$ generation partnership project ($3^{rd}$ Generation Partnership Project, 3GPP) long term evolution (Long Term Evolution, LTE) system as a typical example, an application of multiple input multiple output (Multiple Input Multiple Output, MIMO) multi-antenna technology may affect the accuracy of a CQI feedback. Therefore, the measured CQI usually does not match with the actual CQI of the channel in the existing wireless communication systems. Specifically, an assumed transmission mode (Transmission Mode, TM) applied to feed back the CQI may differ from a TM applied to the transmutation of the base station, because multiple TMs are applied. For example, the TM applied to the transmutation of the based station is TM8, and the TM applied to feed back the CQI is TM2. Due to an introduction of multiple user (Multiple User, MU), a Single User (SU)-based feedback CQI cannot express the channel quality scheduled based on MU. After beamforming is applied, interference on an adjacent cell may be changed as a position of a service terminal is changed, thereby the CQI measured and fed back by a terminal in the adjacent cell can not trace an inter-cell interference, and the measured channel quality does not match with the actual channel quality.

In order to solve the issue that the measured CQI differs from the actual CQI of the channel, a scheme is provided in the existing technology, in which a CQI value is corrected with open loop link adaptation (Open Loop Link Adaptation, OLLA). Specifically, assuming that $\gamma'$ is a target corrected value of CQI SINR, then $\gamma'=\gamma-\text{offset}$, in which $\gamma$ is a CQI value (represented by signal to interference plus noise ratio (SINR)) reported by user equipment (User Equipment, UE) and offset is a corrected value. The base station needs to adjust offset each time after receiving an acknowledgement or negative acknowledgement (ACK/NACK) message from the terminal. If the ACK message is received, then offset=offset$-\text{BLER}_{target}\cdot\Delta$.

$\text{BLER}_{target}$ is an expected block error rate (Block Error Rate, BLER) of the UE, $\Delta$ is an adjusting step of offset. If the NACK message is received, then offset=offset+$(1-\text{BLER}_{target})\cdot\Delta$.

The essence of OLLA scheme is to correct an obtained incorrect CQI. It is attempted to improve the CQI value with a smaller step in the case of a good channel quality (the received ACK is used as a flag); and the UE reduces the level of MCS gradually as soon as possible in the case of a poor channel quality (the received NACK is used as a flag), and hence a success rate of a demodulation is improved.

The inventor found that the OLLA scheme according to the above existing technologies attempts to approach the actual CQI value by continuous iteration. However, the actual CQI value may be changed approach. Therefore, the accuracy of such approach scheme is not good and there still may be a large difference between the obtained CQI and the actual channel quality.

SUMMARY

A method and device for obtaining downlink channel quality information are provided according to embodiments of the invention, so that the obtained downlink CQI conforms to an actual downlink CQI when multi-antenna technology is applied into a wireless communication system.

A method for obtaining downlink channel quality information is provided according to an embodiment of the invention. The method includes:

obtaining, by a transmission node in a cooperative node set, a received noise power of user equipment UE11, and an interference power to the user equipment UE11 by a node in a non-cooperative node set;

obtaining, by the transmission node in the cooperative node set, an inter-user interference power during a multi-user scheduling of the transmission node in the cooperative node set, and a power of received useful signal of the user equipment UE11;

obtaining, by the transmission node in the cooperative node set, an interference power to the user equipment UE11 by a non-transmission node in the cooperative node set by interacting with the non-transmission node in the cooperative node set; and calculating a ratio of the power of received useful signal to a sum of an interference source power and the received noise power of the user equipment UE11, as a value of the downlink channel quality information CQI of a downlink channel between the transmission node and the user equipment UE11, wherein the interference source power includes the inter-user interference power during the multi-user scheduling of the transmission node in the cooperative node set, the obtained interference power to the user equipment UE11 by the node in the non-cooperative node set and the interference power to the user equipment UE11 by the non-transmission node in the cooperative node set.

A device for obtaining downlink channel quality information is provided according to an embodiment of the invention. The device includes:

a first obtaining module configured to obtain a received noise power of user equipment UE11, and an interference power to the user equipment UE11 by a node in a non-cooperative node set;

a second obtaining module configured to obtain an inter-user interference power during a multi-user scheduling of the transmission node in the cooperative node set, and a power of received useful signal of the user equipment UE11;

an interacting module configured to obtain an interference power to the user equipment UE11 by a non-transmission node in the cooperative node set by interacting with the non-transmission node in the cooperative node set; and a calculation module configured to calculate a ratio of the power of received useful signal to a sum of an interference source power and the received noise power of the user equipment UE11, as a value of the downlink channel quality information (CQI) of a down channel between the transmission node and the user equipment UE11; wherein the interference source power includes the inter-user interference power during a multi-user scheduling of the transmission node in the cooperative node set, the obtained interference power to the user equipment UE11 by the node in the non-cooperative node set, and the interference power to the user equipment UE11 by the non-transmission node in the cooperative node set.

According to the embodiments of the present invention, the interference power to user equipment by a non-transmission node in a cooperative node set may be obtained by the transmission node in the cooperative node set interacting with the non-transmission node in the cooperative node set, and a value of a downlink channel quality information CQI between the transmission node and the user equipment is represented with a ratio of a power of received useful signal to a sum of a received noise power of the user equipment and an interference source power. That is, the value of CQI is obtained not in a way that the user equipment feeds back the value of CQI to a node on the network side directly. Therefore, compared with the existing method for obtaining a value of a downlink CQI, in the method according to the embodiment of the present invention, the value of CQI may be obtained by interacting channel status information CSI between cooperative nodes in the cooperative node set in real time. It is solved that the downlink CQI is incorrectly measured in the case that the multi-antenna technology is applied in the wireless communication system. In this way, the downlink CQI, in which the downlink channel is located between the transmission node and the user equipment, may be obtained correctly, exact information of a current channel status is provided to a node (e.g. base station) on the network side, and thus a modulation coding scheme matching with the current channel status is selected.

BRIEF DESCRIPTION OF THE DRAWINGS

In order to specify the technical solution according to the embodiments of the invention, the drawings in the embodiments and the existing technical solutions may be briefly described. Obviously, the following drawings are only part of the embodiments of the invention, and those skilled in the art may obtain other drawings according to these drawings without creative work.

DETAILED DESCRIPTION OF EMBODIMENTS

The technical solution according to embodiments of the present invention will be described clearly and completely as follows in conjunction with the accompany drawings in the embodiments of the present invention. It is obvious that the described embodiments are only a part of the embodiments according to the present invention. All the other embodiments obtained by those skilled in the art based on the embodiments in the present invention fall into the scope of the present invention.

Figure 1:
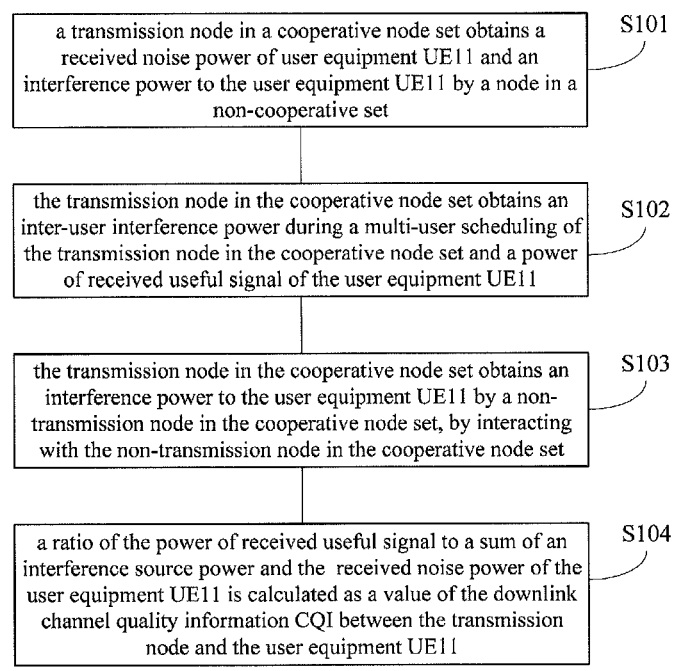
FIG. 1 is a flowchart of a method for obtaining downlink channel quality information according to an embodiment of the present invention.

Referring to FIG. 1, a flowchart of a method for obtaining downlink channel quality information according to an embodiment of the present invention is shown. The method includes:

In S101, a transmission node in a cooperative node set obtains a received noise power of user equipment UE11 and an interference power to the user equipment UE11 by a node in a non-cooperative node set.

In order to improve a coverage capability to a cell-edge user and further improve a capacity of a wireless communication system, in particular to improve a transmission capability of the cell-edge user, based on the existing MIMO multi-antenna technology, a research for a coordinated multiple point (Coordinated Multiple Point, CoMP) technology is proposed in the $3^{rd}$ generation partnership project (the $3^{rd}$ Generation Partnership Project (3GPP). By adequate research and demonstration, CoMP is applied into LTE standardization as an important key technology which supports a subsequent evolution of LTE.

Figure 2:
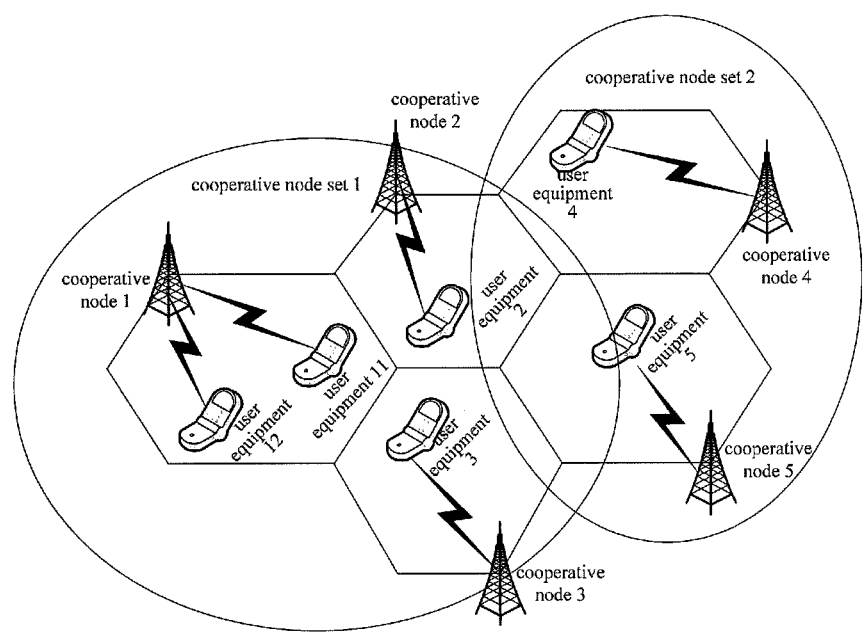
FIG. 2 is a schematic diagram of a cooperation system according to an embodiment of the present invention.

In the embodiment of the present invention, the cooperative node set is a set of multiple wireless network nodes (such as base station) which are adjacent to each other on geographical positions in CoMP technology. The cooperative nodes transmit/receive information to/from a certain wireless terminal, and process information from the certain wireless terminal by cooperating with each other. Thus, the occurrence of interference may be avoided effectively and the interference even may be converted into useful information. In addition, a centralized processing of a baseband signal makes information interaction and share between different base stations more convenient and timely. Nodes in the cooperative node set are divided into two types: a transmission node and a non-transmission node. The transmission node sends information to user equipment served by the transmission node directly. The non-transmission node does not send information to the user equipment served by the transmission node, but may participate in a multi-point coordination. Namely, the non-transmission node cooperates with the transmission node to coordinate and schedule radio resources among different cooperative nodes in the cooperative node set together. As shown in FIG. 2, a cooperative node 1 in a cooperative node set 1 (Sco-1) directly sends information to a user equipment 11 (UE11) and a user equipment 12 (UE12) which are served by the cooperative node 1. Therefore, the cooperative node 1 in the cooperative node set 1 (Sco-1) is a transmission node of UE11 and UE12. Instead of sending information to UE11 and UE12 directly, cooperative node 2 directly sends information to user equipment 2 (UE 2) which is served by the cooperative node 2, and cooperative node 3 directly sends information to user equipment 3 (UE 3) which is served by the cooperative node 3. In addition, the cooperative nodes 2 and 3, together with the transmission node of UE11 and UE12, coordinate and schedule radio resources among different cooperative nodes in the cooperative node set 1 (Sco-1). Therefore, the cooperative nodes 2 and 3 in the cooperative node set 1 (Sco-1) are transmission nodes of UE 2 and UE 3 respectively, which are also the non-transmission nodes of UE11 and UE 12. Therefore, the transmission node and the non-transmission node are relative concepts in a cooperative node set, the type of which may be changed for different user equipments. Moreover, the transmission node and the non-transmission node may perform the information interaction with each other.

In the embodiment of the present invention, the node in the non-cooperative node set neither sends information to the user equipment served by the network node in the cooperative node set, nor participates in the coordination and scheduling for the user equipment served by the network node in the cooperative node set. As shown in FIG. 2, a cooperative node 4 in a cooperative node set 2 (Sco-2) transmits/receives information to/from a user equipments 4 (UE4), and processes information from UE4. A cooperative node 5 in a cooperative node set 2 (Sco-2) transmits/receives information to/from a user equipments 5 (UE4), and processes information from UE5. The cooperative nodes 4 or 5 perform a coordination and scheduling for the user equipment (UE4 or UE5) served by the cooperative nodes 4 or 5 in the cooperative node set 2 (Sco-2) by cooperating with each other. However, the cooperative nodes 4 and 5 neither send information to the user equipment (UE2, UE3, UE11 and UE12) served by the network nodes in the cooperative node set 1 (Sco-1), nor participate in the coordination and scheduling for the user equipment (UE2, UE3, UE11 and UE12) served by the network nodes in the cooperative node set 1 (Sco-1). Therefore, the cooperative node set 2 (Sco-2) is a non-cooperative node set with respect to the cooperative node set 1 (Sco-1). It may be understood that, if the cooperative node 1, 2 or 3 in the cooperative node set 1 (Sco-1) neither sends information to the user equipment (UE4 or UE5) served by the network nodes in the cooperative node set 2 (Sco-2) nor participates in the coordination and scheduling for the user equipment (UE4 or UE5) served by the network nodes in the cooperative node set 2 (Sco-2), the cooperative node set 1 (Sco-1) is a non-cooperative node set with respect to the cooperative node set 2 (Sco-2). Based on FIG. 2 in conjunction with the above description, a cooperative node set and a non-cooperative node set are relative concepts and it is unnecessary for the nodes in the cooperative node set and in the non-cooperative node set to perform the information interaction. However, the node in the non-cooperative node set may interfere to the user equipment in the cooperative node set. For example, when respectively transmitting information to the user equipments 4 (UE4) and 5 (UE5), the cooperative nodes 4 and 5 in the cooperative node set 2 (Sco-2) (which is the non-cooperative node set with respect to the cooperative node set 1 (Sco-1)) may interfere to the user equipment 11 (UE11) in the cooperative node set 1 (Sco-1).

It should be noted that, there may be multiple transmission nodes serving UE11 and UE12 simultaneously. In the cooperation system shown in FIG. 2, it is only a simple assumption for a convenient description that the cooperative node 1 in the cooperative node set 1 (Sco-1) is the transmission node of UE11 and UE12, which should not be understood as limiting the present disclosure.

It should be noted further that, in the cooperation system in FIG. 2, each of the cooperative nodes 2 (Nco-2) and 3 (Nco-3) may be further the transmission node for more user equipment in a coverage ranges thereof. It is only a simple assumption for a convenient description that "the cooperative nodes 2 and 3 are respectively the transmission nodes of UE2 and UE3", which should not be understood as limiting the present disclosure. In the same way, it is only a simple assumption for a convenient description that the cooperative nodes 4 and 5 in the cooperative node set 2 (Sco-2) are respectively the transmission nodes of the user equipment 4 and 5, which should not be understood as limiting the present disclosure.

In S102, the transmission node in the cooperative node set obtains an inter-user interference power during a multi-user scheduling of the transmission node in the cooperative node set and a power of received useful signal of the user equipment UE11.

In S103, the transmission node in the cooperative node set obtains an interference power to the user equipment UE11 by a non-transmission node in the cooperative node set, by interacting with the non-transmission node in the cooperative node set.

In S104, a ratio of the power of received useful signal to a sum of an interference source power and the received noise power of the user equipment UE11 is calculated as a value of the downlink channel quality information CQI between the transmission node and the user equipment UE11. The interference source power includes the inter-user interference power during a multi-user scheduling of the transmission node in the cooperative node set, the obtained interference power to the user equipment UE11 by the node in the non-cooperative node set and the interference power to the user equipment UE11 by the non-transmission node in the cooperative node set.

In the wireless communication system, the downlink channel quality information CQI includes a large amount of information, which may be represented with signal to interference plus noise Ratio (Signal Interference Noise Ratio, SINR) roughly. For example, assuming that the received noise power of the user equipment UE11 is represented with N, the power of received useful signal is represented with S and the interference source power of the user equipment UE11 is represented as $(I_{IUI}+I_{ICI}+I)$, all of which are obtained by the transmission node in the cooperative node set (such as the cooperative node 1 in the cooperative node set Sco-1 shown in FIG. 2). $I_{IUI}$ represents the inter-user interference power during the multi-user scheduling of a transmission node in a cooperative node set (e.g. the cooperative node 1 in the cooperative node set Sco-1 as shown in FIG. 2). $I_{ICI}$ represents the interference power to the user equipment (e.g. user equipment UE11) served by the transmission node in the cooperative node set (e.g. the cooperative node set Sco-1 as shown in FIG. 2), which is caused by the non-transmission node in the cooperative node set (e.g. the cooperative nodes 2 and 3 in the cooperative node set Sco-1 as shown in FIG. 2), that is, which is caused by an inter-cell interference power of the non-transmission node in the cooperative node set. I represents the interference power to user equipment in a certain cooperative node set (e.g. the user equipment UE11 in the cooperative node set Sco-1 as shown in FIG. 2), which is caused by the node in a non-cooperative node set (e.g. the cooperative nodes 4 and 5 in the cooperative node set Sco-2 as shown in FIG. 2). In this way, the value of the downlink channel quality information CQI, in which the downlink channel is between the cooperative node 1 in the cooperative node set Sco-1 and the user equipment UE11 as shown in FIG. 2, may be represented with a ratio $$\gamma = \frac{S}{I_{IUI}+I_{ICI}+I+N}.$$

Based on the method for obtaining the downlink channel quality information according to the embodiment of the invention, the interference power to the user equipment by the non-transmission node in the cooperative node set may be obtained by the transmission node in the cooperative node set interacting with the non-transmission node in the cooperative node set. The ratio of the power of received useful signal to the sum of the interference source power and the received noise power of the user equipment is used to represent the value of the downlink channel quality information CQI, in which the downlink channel is between the transmission node and the user equipment. That is, the value of CQI is obtained not in a way that the user equipment feeds back the value of CQI to a network side node directly. Therefore, compared with the existing method for obtaining the value of the downlink CQI, in the method according to the embodiment of the invention, the value of CQI is obtained by interacting channel status information CSI between cooperative nodes in the cooperative node set in real time. It is solved the issue that the downlink CQI is incorrectly measured when the wireless communication system applies the multi-antenna technology. In this way, the downlink CQI, in which the downlink channel is between the transmission node and the user equipment, may be obtained correctly, exact information of a current channel status is provided to the node (e.g. base station) on the network side, and thus a modulation coding scheme matching with the current channel status is selected.

In the embodiment of the present invention, the user equipment UE11 may feed back the interference power to the user equipment UE11 by the node in the non-cooperative node set and the received noise power $n_{UE11}n_{UE11}^H$ of the user equipment UE11 to the transmission node in the cooperative node set. Therefore, in an embodiment of the present invention, the transmission node in the cooperative node set may obtain the received noise power of the user equipment UE11 and the interference power to the user equipment UE11 by the node in the non-cooperative node set, by receiving from the user equipment UE11 the interference powers to the user equipment UE11 by P nodes in the non-cooperative node set and the received noise power $n_{UE11}n_{UE11}^H$ of the user equipment UE11. On the side of the transmission node, the interference power to the user equipment UE11 by the node in the non-cooperative node set is $$\sum_{p=1}^{P}\sum_{q=1}^{Q_p} P_{Non\_s\_pq}|w_{UE11}^H(H_{Non\_p}P_{Non\_pq})|^2,$$

where $w_{UE11}^H$ is a conjugate transpose of a receiver vector $w_{UE11}$ of the user equipment UE11, $H_{Non\_p}$ is a channel matrix of an arbitrary node $N_{Non\_p}$ in the P nodes of the non-cooperative node set and the user equipment UE11, $P_{Non\_pq}$ is a pre-coding vector employed in beamforming for user equipment $UE_{Non\_pq}$ which is served by an arbitrary node $N_{Non\_p}$ the P nodes of the non-cooperative node set, $P_{Non\_s\_pq}$ is a power assigned to the user equipment $UE_{Non\_pq}$ by the arbitrary node $N_{Non\_p}$ in the P nodes of the non-cooperative node set, $$\sum_{q=1}^{Q_p} P_{Non\_s\_pq}|w_{UE11}^H(H_{Non\_p}P_{Non\_pq})|^2$$

is an interference power to the user equipment UE11 by the arbitrary node $N_{Non\_p}$ the P nodes of the non-cooperative node set, where q is in a range of 1, 2, . . . , $Q_p$, and $Q_p$ is a nature number. The value of $Q_p$ represents the number of user equipment served by the arbitrary node $N_{Non\_p}$ in the P nodes of the non-cooperative node set. The user equipment $UE_{Non\_pq}$ is one of the user equipment served by the arbitrary node $N_{Non\_p}$ in the P nodes of the non-cooperative node set, which is obviously different from the user equipment served by the transmission node in the cooperative node set, such as the user equipment UE11 and a user equipment $UE1_j$, where $UE1_j$ represents other user equipment except the user equipment UE11 in the user equipment served by the transmission node in the cooperative node set.

In the case that there is a reciprocity between uplink and downlink channels in the wireless communication system, a network side node (such as base station) measures a certain signal sent by the user equipment through an uplink channel (or link), to obtain uplink channel information, and then to obtain downlink channel information of a downlink channel (or link) between the network side node and the user equipment with the reciprocity between the uplink and downlink channels in the wireless communication system. It should be noted that, the downlink channel information may be obtained based on the uplink channel information with the reciprocity, but the uplink channel information obtained by measuring the uplink channel includes transmitting power information of the certain signal sent by the user equipment and used to measure the uplink channel. In order to reflect a characteristic of the downlink channel information accurately, it is necessary to consider an adjustment to associated channel information, when the CQI is obtained. Therefore, in another embodiment of the invention, the transmission node in the cooperative node set obtains the received noise power of the user equipment UE11 and the interference power to the user equipment UE11 by the node in the non-cooperative node set, which may be implemented in the following way. The transmission node in the cooperative node set receives a corrected value $$P'_{s11}\left(\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11}\right)$$

of a sum $$\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11}$$

of the obtained interference power $$\sum_{p=1}^{P}\sum_{q=1}^{Q_p} P_{Non\_s\_pq}|w^H_{UE11}(H_{Non\_p}P_{Non\_pq})|^2$$

to the user equipment UE11 by the P nodes in the non-cooperative node set and the received noise power $n_{UE11}n_{UE11}^H$ of the user equipment UE11, where both of the interference power to the user equipment UE11 by the P nodes in the non-cooperative node set and the received noise power of the user equipment UE11 are fed back by the user equipment UE11. Alternatively, the transmission node in the cooperative node set receives $P_{s11}'$ and a sum $$\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11}$$

of the obtained interference power $$\sum_{p=1}^{P}\sum_{q=1}^{Q_p} P_{Non\_s\_pq}|w^H_{UE11}(H_{Non\_p}P_{Non\_pq})|^2$$

to the user equipment UE11 by the P nodes in the non-cooperative node set and the received noise power $n_{UE11}n_{UE11}^H$ of the user equipment UE11, where both of the interference power to the user equipment UE11 by the P nodes in the non-cooperative node set and the received noise power of the user equipment UE11 are fed back by the user equipment UE11; then, the transmission node in the cooperative node set corrects $$\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11},$$

that is, calculate a product of $$\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11}$$

and $P_{s11}'$ to obtain a corrected value $$P'_{s11}\left(\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11}\right).$$

Specifically, $$\sum_{q=1}^{Q_p} P_{Non\_s\_pq}|w^H_{UE11}(H_{Non\_p}P_{Non\_pq})|^2$$

is an interference power to the user equipment UE11 by an arbitrary node $N_{Non\_p}$ in the P nodes of the non-cooperative node set, where q is in a range of 1, 2, ... $Q_p$, $Q_p$ is a natural number, and the value of $Q_p$ represents the number of user equipment served by the arbitrary node $N_{Non\_p}$ in the P nodes of the non-cooperative node set. $P_{Non\_s\_pq}$ is a power assigned to user equipment $UE_{Non\_pq}$ by the arbitrary node $N_{Non\_p}$ in the P nodes of the non-cooperative node set. $P_{s11}'$ is a power of the certain signal which is sent by the user equipment UE11 and is used to measure an uplink channel at the network side, which also is a correction factor for correcting $$\sum_{p=1}^{P}\sum_{q=1}^{Q_p} P_{Non\_s\_pq}|w^H_{UE11}(H_{Non\_p}P_{Non\_pq})|^2 + n_{UE11}n^H_{UE11}$$

fed back by the user equipment UE11. $H_{Non\_p}$ is a channel matrix of an arbitrary node $N_{Non\_p}$ in the P nodes of the non-cooperative node set and the user equipment UE11. $P_{Non\_pq}$ is a pre-coding vector employed in beamforming for user equipment $UE_{Non\_pq}$ which is served by the arbitrary node $N_{Non\_p}$ in the P nodes of the non-cooperative node set. The user equipment $UE_{Non\_pq}$ is one of the user equipment served by the arbitrary node $N_{Non\_p}$ in the P nodes of the non-cooperative node set, which is obviously different from the user equipment served by the transmission node in the cooperative node set, such as the user equipment UE11 and a user equipment UE1j, where UE1j represents other user equipment except the user equipment UE11 in the user equipment served by the transmission node in the cooperative node set. $w_{UE11}^H$ is a conjugate transpose of $w_{UE11}$. $w_{UE11}$ is a receiver vector of the user equipment UE11. The form of the receiver is related to a type of the receiver used by the user equipment UE11, which will not be limited herein.

In an embodiment, the transmission node in the cooperative node set obtains the inter-user interference power during the multi-user scheduling of the transmission node in the cooperative node set and the power of received useful signal of the user equipment UE11. Particularly, the transmission node in the cooperative node set may obtain $P_{S11}$, $H_{UE11}$, $n_{UE11}$, $P_{S1j}$, $P_{UE1j}$ and $P_{UE11}$ via a scheduler thereof, and then calculate the values of $$P_{s11}|w_{UE11}^H(H_{UE11}P_{UE11})|^2 \text{ and } \sum_{j=2}^{J}P_{s1j}|w_{UE11}^H(H_{UE11}P_{UE1j})|^2,$$

where $P_{s11}|w_{UE11}^H(H_{UE11}P_{UE11})|^2$ is the power of received useful signal of the user equipment UE11;

$$\sum_{j=2}^{J}P_{s1j}|w_{UE11}^H(H_{UE11}P_{UE1j})|^2$$

is the inter-user interference power during the multi-user scheduling of the transmission node in the cooperative node set; $P_{S11}$ is a power assigned to the user equipment UE11 by the transmission node; $H_{UE11}$ is a channel matrix of the user equipment UE11 and the transmission node; $n_{UE11}$ is the reception noise signal of the user equipment UE11; $P_{S1j}$ is a power assigned to a user equipment $UE_{1j}$ by the transmission node; $P_{UE1j}$ is a pre-coding vector employed when the transmission node performs beamforming on the user equipment $UE_{1j}$; and $P_{UE11}$ is a pre-coding vector employed when the transmission node performs beamforming on the user equipment UE11. The user equipment $UE_{11}$ differs from the user equipment $UE_{1j}$, where j is in a range of 2, 3, . . . , J, and J is a natural number.

In an embodiment, the transmission node in the cooperative node set obtains the interference power to the user equipment UE11 by the non-transmission node in the cooperative node set, by interacting with the non-transmission node in the cooperative node set, which may be implemented in the following way. The transmission node in the cooperative node set obtains $P_{s\_km}$, $H_k$ and $P_{km}$ by interacting with K non-transmission nodes in the cooperative node set, and then calculates $$\sum_{k=1}^{K}\sum_{m=1}^{M_k}P_{s\_km}|w_{UE11}^H(H_kP_{km})|^2$$

as the interference power to the user equipment UE11 by the K non-transmission nodes in the cooperative node set. Specifically, $P_{s\_km}$ is a power assigned to user equipment UEco_km by an arbitrary non-transmission node $N_k$ in the K non-transmission nodes of the cooperative node set. $H_k$ is a channel matrix of the arbitrary non-transmission node $N_k$ in the K non-transmission nodes of the cooperative node set and the user equipment UE11. $P_{km}$ is a pre-coding vector employed in beamforming for the user equipment UEco_km which is served by the arbitrary non-transmission node $N_k$ in the non-transmission nodes of the cooperative node set. The user equipment UEco_km is one of $M_k$ user equipment served by the arbitrary non-transmission node $N_k$ in the K non-transmission nodes of the cooperative node set, which is obviously different from the user equipment served by the transmission node in the cooperative node set, such as the user equipments UE11 and $UE_{1j}$ (herein, $UE_{1j}$ represents other user equipment except the user equipment UE11, in the user equipment served by the transmission node in the cooperative node set). m is in a range of 1, 2, . . . , $M_k$, and $M_k$ is a natural number. The value of m represents the number of user equipment served by the arbitrary non-transmission node $N_k$ in the K non-transmission nodes of the cooperative node set.

$$\sum_{m=1}^{M_k}P_{s\_km}|w_{UE11}^H(H_kP_{km})|^2$$

is an interference power to the user equipment UE11 by the arbitrary non-transmission node $N_k$ in the K non-transmission nodes of the cooperative node set.

Figure 3:
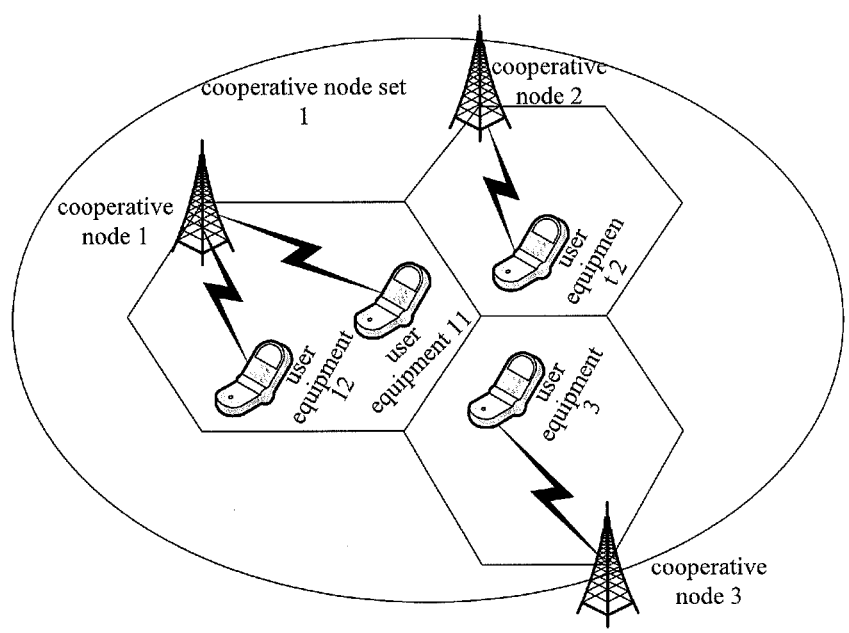
FIG. 3 is a schematic diagram of a cooperation system according to another embodiment of the present invention.

Taking FDD (Frequency Division Duplexing) format as an example, it is assumed that a cooperation system shown in FIG. 3 is a cooperative node set 1 (Sco-1) including a cooperative node 1 (Nco-1), a cooperative node 2 (Nco-2) and a cooperative node 3 (Nco-3), in which the cooperative node 1 (Nco-1) is a transmission node of user equipment UE11 and UE12, the cooperative node 2 (Nco-2) and the cooperative node 3 (Nco-3) are non-transmission nodes of the user equipment UE11 and UE12. In addition, the cooperative node 2 (Nco-2) may also be a transmission node of user equipment UE2 and the cooperative node 3 (Nco-3) may also be a transmission node of user equipment UE3. Those skilled in the art may understand that there may be multiple transmission nodes serving UE11 and UE12 simultaneously. In the cooperation system shown in FIG. 3, it is only a simple assumption for a convenient description that the cooperative node 1 in the cooperative node set 1 (Sco-1) is the transmission node of UE11 and UE12, which should not be understood as limiting the present disclosure. Moreover, each of the cooperative node 2 (Nco-2) and the cooperative node 3 (Nco-3) further may be a transmission node of more user equipment in the coverage range thereof. It is only a simple assumption for a convenient description that "the cooperative node 2 (Nco-2) and the cooperative node 3 (Nco-3) may also be transmission nodes of the user equipment UE2 and UE3 respectively, which should not be understood as limiting the present disclosure.

The respective transmissions of information from the cooperative node 2 (Nco-2) and the cooperative node 3 (Nco-3) to the user equipment UE2 and UE3 may interfere with a reception of a downlink signal by the user equipment UE11, which is a part of a whole interference source of the user equipment UE11.

On the side of the user equipment UE11, a signal received by the user equipment UE11 includes a received useful signal and an interference source. For example, the respective transmissions of information from the cooperative node 2 (Nco-2) and the cooperative node 3 (Nco-3) to the user equipments UE1 and UE3 may interfere with the downlink signal received by the user equipment UE11. In the embodiment, the signal $Y_{UE11}$ received by the user equipment UE11

(for simplicity, referred to as "a received signal of the user equipment UE11" hereinafter) may be expressed with the following model:

$$Y_{UE11} = H_{UE11}P_{UE11}s_{11} + H_{UE11}P_{UE12}s_{12} + \sum_{i=2}^{3} H_i P_i t_i + n_{UE11}.$$

In the model of the received signal $Y_{UE11}$ of the user equipment UE11, $H_{UE11}$ represents a channel matrix of the user equipment UE11 and a transmission node 1 (Nco-1). $P_{UE11}$ represents a pre-coding vector employed when the transmission node 1 (Nco-1) of the user equipment UE11 performs beamforming on the user equipment UE11. $P_{UE12}$ represents a pre-coding vector employed when the transmission node 1 (Nco-1) of the user equipment UE12 performs beamforming on the user equipment UE12. $H_2$ represents a channel matrix of a non-transmission node 2 of the user equipment UE11 (which is the transmission node of the user equipment UE2) and the user equipment UE11; and $H_3$ represents a channel matrix of a non-transmission node 3 of the user equipment UE11 (which is the transmission node of the user equipment UE3) and the user equipment UE11. $P_2$ represents a pre-coding vector employed in beamforming for the user equipment UE2 which is served by the non-transmission node 2 (Nco-2) of the user equipment UE11; and $P_3$ represents a pre-coding vectors employed in beamforming for the user equipment UE3 which is served by the non-transmission node 3 (Nco-3) of the user equipment UE11. $s_{11}$ represents a signal sent from the transmission node 1 (Nco-1) of the user equipment UE11 to the user equipment UE11; and $s_{12}$ represents a signal sent from the transmission node 1 (Nco-1) of the user equipment UE11 to the user equipment UE12. $t_2$ represents a signal sent from the non-transmission node 2 (Nco-2) of the user equipment UE11 to the user equipment UE2; and $t_3$ represents a signal sent from the non-transmission node 3 (Nco-3) of the user equipment UE11 to the user equipment UE3. $n_{UE11}$ represents a noise signal of the user equipment UE11. As described above, in the embodiment of the invention, the transmission node in the cooperative node set may perform the information interaction with the non-transmission node in the cooperative node set. Therefore, the transmission node 1 (Nco-1) of the user equipment UE11 may obtain $H_2$, $P_2$ and a power $P_{s2}$ assigned to the user equipment UE2 by the non-transmission node 2 (Nco-2) of the user equipment UE11, by interacting with the non-transmission node 2 (Nco-2) of the user equipment UE11; and the transmission node 1 (Nco-1) of the user equipment UE11 may obtain $H_3$, $P_3$ and a power $P_{s3}$ assigned to the user equipment UE3 by the non-transmission node 3 (Nco-3) of the user equipment UE11, by interacting with the non-transmission node 3 (Nco-3) of the user equipment UE11.

It is assumed that in the cooperative node set shown in FIG. 3, a total power assigned to the user equipment UE11 and UE12 by the transmission node 1 (Nco-1) of the user equipment UE11 is 1; a power $P_{s2}$ assigned to the user equipment UE2 by the non-transmission node 2 (Nco-2) of the user equipment UE11 is 1; a power $P_{s3}$ assigned to the user equipment UE3 by the non-transmission nodes 3 of the user equipment UE11 is 1; and the user equipment UE11 and UE12 equally divide the total power assigned by the transmission node 1 (Nco-1). That is, both the power $P_{s12}$ assigned to the user equipment UE12 by the transmission node 1 (Nco-1) of the user equipment UE11, and the power $P_{s11}$ assigned to the user equipment UE11 by the transmission node 1 (Nco-1) of the user equipment UE11, are equal to ½. The transmission node 1 (Nco-1) of the user equipment UE11 may obtain the powers $P_{s12}$ and $P_{s11}$ by a scheduling module thereof. In addition, the transmission node 1 of the user equipment UE11 may obtain the powers assigned to the user equipment UE2 and UE3 respectively by the non-transmission nodes 2 and 3 of the user equipment UE11, by interacting with the non-transmission nodes 2 and 3 of the user equipment UE11, where each of the powers is equal to 1. The noise signal $n_{UE11}$ of the user equipment UE11 is fed back to the transmission node 1 (Nco-1) of the user equipment UE11 by the user equipment UE11.

Based on the above assumption, in the cooperative node set as shown in FIG. 3, the value $\gamma_{UE11}$ of the downlink channel quality information CQI of a downlink channel between the user equipment UE11 and the transmission node 1 (Nco-1) of the user equipment UE11 may be expressed as:

$$\gamma_{UE11} = \frac{\frac{1}{2}|w_{UE11}^H(H_{UE11}P_{UE11})|^2}{\frac{1}{2}|w_{UE11}^H(H_{UE11}P_{UE12})|^2 + \sum_{i=2}^{3}|w_{UE11}^H(H_iP_i)|^2 + n_{UE11}n_{UE11}^H}.$$

In the above $\gamma_{UE11}$, the power of received useful signal S of the user equipment UE11 is $\frac{1}{2}|w_{UE11}^H(H_{UE11}P_{UE11})|^2$, the inter-user interference power $I_{IUI}$ during the multi-user scheduling of the transmission node 1 (Nco-1) in the cooperative node set Sco-1 is $\frac{1}{2}|w_{UE11}^H(H_{UE11}P_{UE12})|^2$, the inter-cell interference power $I_{ICI}$ by the non-transmission nodes 2 (Nco-2) and 3 (Nco-3) of the user equipment UE11 in the cooperative node set Sco-1 is $$\sum_{i=2}^{3}|w_{UE11}^H(H_iP_i)|^2,$$

and the received noise power N of the user equipment UE11 is $n_{UE11}n_{UE11}^H$. It should be noted that, since there is no non-cooperative node set of the cooperative node set Sco-1 in the cooperation system shown in FIG. 3, there is no interference power caused by a node in the non-cooperative node set, that is, the value of the interference power I caused by the node in the non-cooperative node set is 0.

In practice, in the above expression $$\frac{1}{2}|w_{UE11}^H(H_{UE11}P_{UE11})|^2$$

S, $w_{UE11}^H$ is a conjugate transpose of a receiver vector $w_{UE11}$ employed by the user equipment UE11; $H_{UE11}P_{UE11}$ represents an equivalent channel obtained by pre-coding a channel $H_{UE11}$ between the transmission node 1 (Nco-1) of the user equipment UE11 and the user equipment UE11 with $P_{UE11}$; $|w_{UE11}^H(H_{UE11}P_{UE11})|^2$ represents a channel gain obtained by passing the signal $s_{11}$ sent from the transmission node 1 (Nco-1) of the user equipment UE11 to the user equipment UE11 through the equivalent channel $H_{UE11}P_{UE11}$ and the receiver $w_{UE11}$. Therefore, a received useful signal of the user equipment UE11 is $$\frac{1}{2}|w_{UE11}^H(H_{UE11}P_{UE11})|^2,$$

instead of the power $P_{s11}$ assigned to the user equipment UE11 by the transmission node 1 (Nco-1). In the above expression $$\frac{1}{2}|w_{UE11}^H(H_{UE11}P_{UE12})|^2$$

of $I_{IUI}$, $H_{UE11}P_{UE12}$ represents an equivalent channel obtained by pre-coding the channel $H_{UE11}$ between the transmission node 1 (Nco-1) of the user equipment UE11 and the user equipment UE11 with $P_{UE12}$; $|w_{UE11}^H(H_{UE11}P_{UE12})|^2$ represents a channel gain obtained by passing the signal $s_{12}$ sent from the transmission node 1 (Nco-1) to the user equipment UE12 through the equivalent channel $H_{UE11}P_{UE12}$ and the receiver $w_{UE11}$. In the expression $$\sum_{i=2}^{3}|w_{UE11}^H(H_iP_i)|^2$$

or $I_{ICI}$, $H_iP_i$ represents an equivalent channel obtained by pre-coding a channel $H_i$ between the user equipment UE11 and the non-transmission node 2 (Nco-2) or between the user equipment UE11 and the non-transmission node 3 (Nco-3) of the user equipment UE11 with $P_i$; $|w_{UE11}^H(H_iP_i)|^2$ represents a channel gain, which is obtained by passing a signal $t_2$ sent from the non-transmission node 2 (Nco-2) of the user equipment UE11 to the user equipment UE2 or a signal $t_3$ sent from the non-transmission node 3 (Nco-3) of the user equipment UE11 to the user equipment UE3, through the equivalent channel $H_iP_i$ and the receiver $w_{UE11}$.

Figure 4:
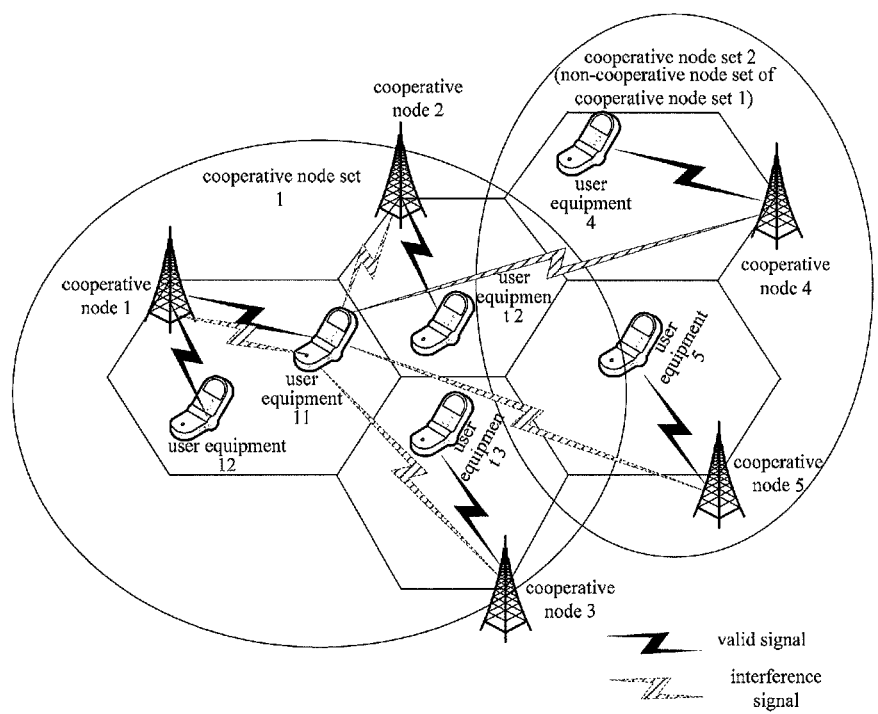
FIG. 4 is a schematic diagram of a cooperation system according to another embodiment of the present invention.

Further, taking frequency division duplexing FDD format as an example, it is assumed that a cooperation system includes a cooperative node set Sco-1 and a cooperative node set Sco-2, and the cooperative node set Sco-2 is a non-cooperative node set with respect to the cooperative node set Sco-1, as shown in FIG. 4. In the cooperation system shown in FIG. 4, the cooperative node set Sco-1 includes a cooperative node 1 (Nco-1), a cooperative node 2 (Nco-2) and a cooperative node 3 (Nco-3); and the cooperative node set Sco-2 includes a cooperative node 4 (Nco-4) and a cooperative node 5 (Nco-5). The cooperative node 1 (Nco-1) is a transmission node of the user equipment UE11 and UE12. The cooperative nodes 2 (Nco-2) and 3 (Nco-3) are non-transmission nodes of the user equipment UE11 and UE12. The cooperative node 2 (Nco-2) is a transmission node of the user equipment UE2, and the cooperative node 3 (Nco-3) is a transmission node of the user equipment UE3. The cooperative node 4 (Nco-4) is a transmission node of the user equipment UE4; and the cooperative node 5 (Nco-5) is a transmission node of the user equipment UE5. Those skilled in the art may understand that, in the cooperation system shown in FIG. 4, there may be multiple transmission nodes serving UE11 and UE12 simultaneously. It is only a simple assumption for a convenient description that "the cooperative node 1 in the cooperative node set 1 (Sco-1) is the transmission node of the UE11 and UE12", which should not be understood as limiting the present disclosure. Moreover, each of the cooperative nodes 2 (Nco-2) and 3 (Nco-3) may further be a transmission node of more user equipment in the coverage range thereof. It is only a simple assumption for a convenient description that "the cooperative nodes 2 (Nco-2) and 3 (Nco-3) also may be transmission nodes of the user equipment UE2 and UE3 respectively", which should not be understood as limiting the present disclosure. Similarly, it is also a simple assumption for a convenient description that "the cooperative nodes 4 (Nco-4) and 5 (Nco-5) are transmission nodes of the user equipment UE4 and UE5 respectively" which should not be understood as limiting the present disclosure.

The respective transmissions of information from the cooperative nodes 2 (Nco-2), 3 (Nco-3), 4 (Nco-4) and 5 (Nco-5) to the user equipment UE2, UE3, UE4 and UE5, may interfere with a reception of a downlink signal by the user equipment UE11, which is a part of a whole interference source of the user equipment UE11.

On the side of the user equipment UE11, a received signal includes the received noise of the user equipment UE11, the received useful signal and the interference source. For example, the respective transmissions of information from the cooperative nodes 2 (Nco-2), 3 (Nco-3), 4 (Nco-4) and 5 (Nco-5) to the user equipment UE2, UE3, UE4 and UE5, may interfere with the reception of a downlink signal by the user equipment UE11. In the embodiment, the signal $Y_{UE11}$ received by the user equipment UE11 (for simplicity, referred to as "received signal of the user equipment UE11") may be expressed with the following model:

$$Y_{UE11} = H_{UE11}P_{UE11}s_{11} + H_{UE11}P_{UE12}s_{12} + \sum_{i=2}^{3}H_iP_it_i + \sum_{i=4}^{5}H_iP_it_i + n_{UE11}.$$

In the above model of the received signal $Y_{UE11}$ of the user equipment UE11, $H_{UE11}$ represents a channel matrix of the user equipment UE11 and the transmission node 1 (Nco-1). $P_{UE11}$ represents a pre-coding vector employed when the transmission node 1 (Nco-1) of the user equipment UE11 performs beamforming on the user equipment UE11. $s_{11}$ represents a signal sent from the transmission node 1 (Nco-1) of the user equipment UE11 to the user equipment UE11. $H_{UE11}P_{UE11}s_{11}$ is a received useful signal of the user equipment UE11, which may be obtained by a scheduling module of the user equipment UE11. $P_{UE12}$ represents a pre-coding vector employed when the transmission node 1 (Nco-1) of the user equipment UE12 performs beamforming on the user equipment UE12. $s_{12}$ represents a signal sent from the transmission node 1 (Nco-1) of the user equipment UE12 to the user equipment UE12. $H_{UE11}P_{UE12}s_{12}$ is an inter-user interference signal generated during the multi-user scheduling, which may be obtained by the scheduling module of the user equipment UE11. $P_2$ represents a pre-coding vector employed in beamforming for the user equipment UE2 which is served by the non-transmission node 2 (Nco-2) of the user equipment UE11; and $P_3$ represents a pre-coding vector employed in beamforming for the user equipment UE3 which is served by the non-transmission node 3 (Nco-3) of the user equipment UE11. $t_2$ represents a signal sent from the non-transmission node 2 (Nco-2) of the user equipment UE11 to the user equipment UE2; and $t_3$ represents a signal sent from the non-transmission node 3 (Nco-3) of the user equipment UE11 to the user equipment UE3. $H_2$ represents a channel matrix of the non-transmission node 2 (Nco-2) of the user equipment UE11 (the transmission node of the user equipment UE2) and the user equipment UE11; and $H_3$ represents a channel matrix of the non-transmission node 3 (Nco-3) of the user equipment UE11 (the transmission node of the user equipment UE3) and the user equipment UE11.

$$\sum_{i=2}^{3} H_i P_i t_i$$

are inter-cell interference signals of the non-transmission nodes 2 (Nco-2) and 3 (Nco-3) of the user equipment UE11 in the cooperative node set Sco-1, which may be obtained by performing an interaction between the transmission node 1 (Nco-1) of the user equipment UE11 and the non-transmission nodes 2 (Nco-2) and 3 (Nco-3) of the user equipment UE11. $P_4$ represents a pre-coding vector employed in beamforming for the user equipment UE4 which is served by the cooperative node 4 (Nco-4) in the cooperative node set Sco-2 (which is a non-cooperative node set with respect to the cooperative node set Sco-1); and $P_5$ represents a pre-coding vector employed in beamforming for the user equipment UE5 which is served by the cooperative node 5 (Nco-5) in the cooperative node set Sco-2. $t_4$ represents a signal sent from the cooperative node 4 (Nco-4) to the user equipment UE4; and $t_5$ represents a signal sent from the cooperative node 5 (Nco-5) to the user equipment UE5.

$$\sum_{i=4}^{5} H_i P_i t_i$$

are interference signals caused by the cooperative nodes 4 (Nco-4) and 5 (Nco-5) in the non-cooperative node set Sco-2 (with respect to the cooperative node set Sco-1), which may be measured by the user equipment UE11 and fed back to the transmission node 1 (Nco-1) of the user equipment UE11. The noise signal $n_{UE11}$ of the user equipment UE11 is fed back to the transmission node 1 (Nco-1) of the user equipment UE11 by the user equipment UE11.

It is assumed that in the cooperation system shown in FIG. 4, a power assigned to the user equipment UE11 by the transmission node 1 (Nco-1) of the user equipment UE11 is represented as $P_{s11}$, a power assigned to the user equipment UE12 by the transmission node 1 (Nco-1) of the user equipment UE11 is represented as $P_{s12}$, and both of $P_{s11}$ and $P_{s12}$ may be obtained by the transmission node 1 (Nco-1) of the user equipment UE11 via a scheduling module thereof; a power assigned to the user equipment UE2 by the non-transmission node 2 (Nco-2) of the user equipment UE11 is represented as $P_{s2}$, and a power assigned to the user equipment UE3 by the non-transmission node 3 (Nco-3) of the user equipment UE11 is represented as $P_{s3}$; a power assigned to the user equipment UE4 by the cooperative node 4 (Nco-4) in the cooperative node set Sco-2 (which is a non-cooperative node set with respect to the cooperative node set Sco-1) is represented as $P_{s4}$, and a power assigned to the user equipment UE5 by the cooperative node 5 (Nco-5) in the cooperative node set Sco-2 is represented as $P_{s5}$; and $P_{s2}$ and $P_{s3}$ may be obtained by performing the interaction between the transmission node 1 (Nco-1) of the user equipment UE11 and the cooperative nodes 2 (Nco-2) and 3 (Nco-3).

Based on the above assumption, in the cooperation system shown in FIG. 4, the value $\gamma_{UE11}$ of the downlink channel quality information CQI of the downlink channel between the user equipment UE11 and the transmission node (Nco-1) of the user equipment UE11 may be expressed as:

$$\gamma_{UE11} = \frac{P_{s11}|w_{UE11}^H(H_{UE11}P_{UE11})|^2}{P_{s12}|w_{UE11}^H(H_{UE11}P_{UE12})|^2 + \sum_{i=2}^{3} P_{si}|w_{UE11}^H(H_i P_i)|^2 + \sum_{i=4}^{5} P_{si}|w_{UE11}^H(H_i P_i)|^2 + n_{UE11}n_{UE11}^H}.$$

In the above $\gamma_{UE11}$, the power S of received useful signal of the user equipment UE11 is $P_{s11}|w_{UE11}^H(H_{UE11}P_{UE11})|^2$, the inter-user interference power $I_{IUI}$ from the transmission node 1 (Nco-1) in the cooperative node set Sco-1 is $P_{s12}|w_{UE11}^H(H_{UE11}P_{UE12})|^2$, and the inter-cell interference power $I_{ICI}$ cause by the non-transmission nodes 2 (Nco-2) and 3 (Nco-3) of the user equipment UE11 in the cooperative node set Sco-1 is $$\sum_{i=2}^{3} P_{si}|w_{UE11}^H(H_i P_i)|^2,$$

the interference power I cause by the cooperative nodes 4 (Nco-4) and 5 (Nco-5) in the non-cooperative node set Sco-2 (which is a non-cooperative node set in relevant to the cooperative node set Sco-1) is $$\sum_{i=4}^{5} P_{si}|w_{UE11}^H(H_i P_i)|^2,$$

and the received noise power N of the user equipment UE11 is $n_{UE11}n_{UE11}^H$.

In the above expression $P_{s11}|w_{UE11}^H(H_{UE11}P_{UE11})|^2$ of S, $w_{UE11}^H$ is a conjugate transpose of a receiver vector $w_{UE11}$ employed by the user equipment UE11; $H_{UE11}P_{UE11}$ represents an equivalent channel obtained by pre-coding a channel $H_{UE11}$ between the transmission node 1 (Nco-1) of the user equipment UE11 and the user equipment UE11 with $P_{UE11}$; $|w_{UE11}^H(H_{UE11}P_{UE11})|^2$ represents a channel gain obtained by passing the signal $s_{11}$ sent from the transmission node 1 (Nco-1) of the user equipment UE11 to the user equipment UE11 through the equivalent channel $H_{UE11}P_{UE11}$ and the receiver $w_{UE11}$. Therefore, the received useful signal of the user equipment UE11 is $P_{s11}|w_{UE11}^H(H_{UE11}P_{UE11})|^2$, instead of the power $P_{s11}$ assigned to the user equipment UE11 by the transmission node 1 (Nco-1). In the above expression $P_{s12}|w_{UE11}^H(H_{UE11}P_{UE12})|^2$ of $I_{IUI}$, $H_{UE11}P_{UE12}$ represents an equivalent channel obtained by pre-coding the channel $H_{UE11}$ between the transmission node 1 (Nco-1) of the user equipment UE11 and the user equipment UE11 with $P_{UE12}$; $|w_{UE11}^H(H_{UE11}P_{UE12})|^2$ represents a channel gain obtained by passing the signal $s_{12}$ sent from the transmission node 1 (Nco-1) to the user equipment UE12 through the equivalent channel $H_{UE11}P_{UE12}$ and the receiver $w_{UE11}$. In the expression $$\sum_{i=2}^{3} P_{si}|w_{UE11}^H(H_i P_i)|^2$$

of $I_{ICI}$, $H_i P_i$ represents an equivalent channel obtained by pre-coding a channel $H_i$ between the user equipment UE11 and the non-transmission nodes 2 (Nco-2) or between the user equipment UE11 and the non-transmission node 3 (Nco-3) of the user equipment UE11 with $P_i$; $|w_{UE11}^H(H_i P_i)|^2$ represents a channel gain, which is obtained by passing a signal $t_2$ sent from the non-transmission node 2

(Nco-2) of the user equipment UE11 to the user equipment UE2 or a signal $t_3$ sent from the non-transmission node 3 (Nco-3) of the user equipment UE11 to the user equipment UE3, through the equivalent channel $H_iP_i$ and the receiver $w_{UE11}$. In the above expression $$\sum_{i=4}^{5} P_{si}|w_{UE11}^H(H_iP_i)|^2$$

of I, $H_iP_i$ represents an equivalent channel, which is obtained by pre-coding a channel $H_i$ between the user equipment UE11 and the cooperative node 4 (Nco-4) in the cooperative node set Sco-2 (which is a non-cooperative node set with respect to the cooperative node set Sco-1) or between the user equipment UE11 and the cooperative node5 (Nco-5) in the cooperative node set Sco-2 with $P_i$; $|w_{UE11}^H(H_iP_i)|^2$ represents a channel gain, which is obtained by passing a signal $t_4$ sent from the cooperative node 4 (Nco-4) in the cooperative node set Sco-2 (which is a non-cooperative node set with respect to the cooperative node set Sco-1) to the user equipment UE4 or a signal $t_5$ sent from the cooperative node 5 (Nco-5) in the cooperative node set Sco-2 to the user equipment UE5, through the equivalent channel $H_iP_i$ and the receiver $w_{UE11}$.

In the aforementioned, the method according to the invention is described by taking the FDD format as an example. In the following, a method according to the invention is described by taking time division duplexing (Time Division Duplexing, TDD) format as an example.

TDD format differs from FDD format in that a network side node (e.g. base station) measures a certain signal sent by the user equipment through an uplink channel (or link), to obtain uplink channel information, and then to obtain downlink channel information of a downlink channel (or link) between the network side node and the user equipment with the reciprocity between the uplink and downlink channels in TDD format. It should be noted that, the downlink channel information may be obtained based on the uplink information with the reciprocity, but the uplink channel information obtained by measuring the uplink channel includes transmitting power information of the certain signal sent by the user equipment and used to measure the uplink channel. In order to reflect a characteristic of the downlink channel information accurately, it is necessary to consider an adjustment to associated channel information when the CQI is obtained. Specifically, the transmission node in the cooperative node set receives a corrected value $$P'_{s11}\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right)$$

of a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of the obtained interference power $$\sum_{p=1}^{P}\sum_{q=1}^{Q_p} P_{Non\_s\_pq}|w_{UE11}^H(H_{Non\_p}P_{Non\_pq})|^2$$

to the user equipment UE11 by P nodes in the non-cooperative node set and the received noise power $n_{UE11}n_{UE11}^H$ of the user equipment UE11, where both of the interference power to the user equipment UE11 by the P nodes in the non-cooperative node set and the received noise power of the user equipment UE11 are fed back by the user equipment UE11. Particularly, $P_{Non\_s\_pq}$ is a power assigned to a user equipment $UE_{Non\_pq}$ by an arbitrary node $N_{Non\_p}$ in the P nodes of the non-cooperative node set.

$$\sum_{q=1}^{Q_p} P_{Non\_s\_pq}|w_{UE11}^H(H_{Non\_p}P_{Non\_pq})|^2$$

is an interference power to the user equipment UE11 by the arbitrary node $N_{Non\_p}$ in the P nodes of the non-cooperative node set. $P_{s11}'$ is a power of the certain signal which is sent by the user equipment UE11 and used to measure an uplink channel at the network side, which also is a correction factor for correcting $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

by the user equipment UE11. $H_{Non\_p}$ is a channel matrix of an arbitrary node $N_{Non\_p}$ in the P nodes of the non-cooperative node set and the user equipment UE11. $P_{Non\_pq}$ is a pre-coding vector employed in beamforming for the user equipment $UE_{Non\_pq}$ which is served by the arbitrary node $N_{Non\_p}$ in the P nodes of the non-cooperative node set, where q is in a range of 1, 2, . . . , $Q_p$, $Q_p$ is a natural number, and the value of $Q_p$ represents the number of user equipment served by the arbitrary node $N_{Non\_p}$ in the P nodes of the non-cooperative node set. The user equipment $UE_{Non\_pq}$ is one of the user equipment served by the arbitrary node $N_{Non\_p}$ in the P nodes of the non-cooperative node set, which is obviously different from the user equipment served by the transmission node in the cooperative node set, such as the user equipment UE11 and a user equipment UE1j, where UE1j represents other user equipment except the user equipment UE11 in the user equipment served by the transmission node in the cooperative node set. $P_{S11}$, $H_{UE11}$, $n_{UE11}$, $P_{S1j}$, $P_{UE1j}$ and $P_{UE11}$ may be obtained by a scheduler, and then the values of $P_{s11}|w_{UE11}^H(H_{UE11}P_{UE11})|^2$ and are calculated.

$$\sum_{j=2}^{J} P_{s1j}|w_{UE11}^H(H_{UE11}P_{UE1j})|^2$$

$P_{s11}|w_{UE11}^H(H_{UE11}P_{UE11})|^2$ is taken as the power of received useful signal of the user equipment UE11, and $$\sum_{j=2}^{J} P_{s1j}|w_{UE11}^H(H_{UE11}P_{UE1j})|^2$$

is taken as the inter-user interference power during the multi-user scheduling of the transmission node in the cooperative node set. As the same as the aforementioned embodiment, $P_{S11}$ is a power assigned to the user equipment UE11 by the transmission node; $H_{UE11}$ is a channel matrix of the user equipment UE11 and the transmission node; $n_{UE11}$ is the reception noise signal of the user equipment UE11; $P_{S1j}$ is a power assigned to a user equipment $UE_{1j}$ by the transmission node; $P_{UE1j}$ is a pre-coding vector employed when the transmission node performs beamforming on the user equipment $UE_{1j}$; and $P_{UE11}$ is a pre-coding vector employed when the transmission node performs beamforming on the user equipment UE11. The user equipment $UE_{11}$ differs from the user equipment $UE_{1j}$, where j is in a range of 2, 3, ..., J, and J is a natural number. $w_{UE11}^H$ is a conjugate transpose of a receiver vector $w_{UE11}$ of the user equipment UE11. $P_{s\_km}$, $H_k$ and $P_{km}$ are obtained by interacting with K non-transmission nodes in the cooperative node set, and $$\sum_{k=1}^{K}\sum_{m=1}^{M_k} P_{s\_km}|w_{UE11}^H(H_k P_{km})|^2$$

are calculated.

$$\sum_{k=1}^{K}\sum_{m=1}^{M_k} P_{s\_km}|w_{UE11}^H(H_k P_{km})|^2$$

is taken as the interference power to the user equipment UE11 by the non-transmission node in the cooperative node set. Particularly, m is in a range of 1, 2, ..., $M_k$, and $M_k$ is a natural number; $P_{s\_km}$ is a power assigned to a user equipment UEco_km by an arbitrary non-transmission node $N_k$ in the K non-transmission nodes of the cooperative node set; $H_k$ is a channel matrix of the arbitrary non-transmission node $N_k$ in the K non-transmission nodes of the cooperative node set and the user equipment UE11; $P_{km}$ is a pre-coding vector employed in beamforming for the user equipment UEco_km which is served by the arbitrary non-transmission node $N_k$ in the K non-transmission nodes of the cooperative node set; The user equipment UEco_km is one of $M_k$ user equipment served by the arbitrary node $N_k$ in the P nodes of the non-cooperative node set, which is obviously different from the user equipment served by the transmission node in the cooperative node set, such as the user equipment UE11 and a user equipment $UE1_j$, where $UE1_j$ represents other user equipment except the user equipment UE11 in the user equipment served by the transmission node in the cooperative node set.

Taking TDD format as an example, it is assumed that a cooperation system includes a cooperative node set Sco-1 and a cooperative node set Sco-2, and the cooperative node set Sco-2 is a non-cooperative node set with respect to the cooperative node set Sco-1, as shown in FIG. 4. In the cooperation system shown in FIG. 4, the cooperative node set Sco-1 includes a cooperative node 1 (Nco-1), a cooperative node 2 (Nco-2) and a cooperative node 3 (Nco-3); and the cooperative node set Sco-2 includes a cooperative node 4 (Nco-4) and a cooperative node 5 (Nco-5). The cooperative node 1 (Nco-1) is a transmission node of the user equipment UE11 and UE12. The cooperative nodes 2 (Nco-2) and 3 (Nco-3) are respectively non-transmission nodes of the user equipment UE11 and UE12. The cooperative node 2 (Nco-2) may be a transmission node of the user equipment UE2; and the cooperative node 3 (Nco-3) may be a transmission node of the user equipment UE3. The cooperative node Nco-4 may be a transmission node of the user equipment UE4; and the cooperative node Nco-5 may be a transmission node of the user equipment UE5. The respective transmissions of information from the cooperative nodes 2 (Nco-2), 3(Nco-3), 4 (Nco-4) and (Nco-5) to the user equipments UE2, UE3, UE4 and UE5, may interfere with a reception of a downlink signal by the user equipment UE11, which is a part of a whole interference source of the user equipment UE11.

On the side of the user equipment UE11, a received signal includes a received noise of the user equipment UE11, a received useful signal and an interference source. For example, the respective transmissions of information from the cooperative nodes 2 (Nco-2), 3(Nco-3), 4 (Nco-4) and 5 (Nco-5) to the user equipment UE2, UE3, UE4 and UE5 may interfere with the downlink signal received by the user equipment UE11. In the embodiment, the signal $Y_{UE11}$ received by the user equipment UE11 (for simplicity, referred to as "received signal of the user equipment UE11") may be expressed with the following model:

$$Y_{UE11} = H_{UE11}P_{UE11}s_{11} + H_{UE11}P_{UE12}s_{12} + \sum_{i=2}^{3} H_i P_i t_i + \sum_{i=4}^{5} H_i P_i t_i + n_{UE11}.$$

In the above model of the received signal $Y_{UE11}$ of the user equipment UE11, $H_{UE11}$ represents a channel matrix of the user equipment UE11 and the transmission node 1 (Nco-1). $P_{UE11}$ represents a pre-coding vector employed when the transmission node 1 (Nco-1) of the user equipment UE11 performs beamforming on the user equipment UE11. $s_{11}$ represents a signal sent from the transmission node 1 (Nco-1) of the user equipment UE11 to the user equipment UE11. $H_{UE11}P_{UE11}s_{11}$ is a received useful signal of the user equipment UE11, which may be obtained by a scheduling module of the user equipment UE11. $P_{UE12}$ represents a pre-coding vector employed when the transmission node 1 (Nco-1) of the user equipment UE12 performs beamforming on the user equipment UE12. $s_{12}$ represents a signal sent from the transmission node 1 (Nco-1) of the user equipment UE12 to the user equipment UE12. $H_{UE11}P_{UE12}s_{12}$ is an inter-user interference signal generated during the multi-user scheduling, which may be obtained by the scheduling module of the user equipment UE11. $P_2$ represents a pre-coding vector employed in beamforming for the user equipment UE2 which is served by the non-transmission node 2 (Nco-2) of the user equipment UE11; and $P_3$ represents a pre-coding vectors employed in beamforming for the user equipment UE3 which is served by the non-transmission node 3 (Nco-3) of the user equipment UE11. $t_2$ represents a signal sent from the non-transmission node 2 (Nco-2) of the user equipment UE11 to the user equipment UE2; and $t_3$ represents a signal sent from the non-transmission node 3 (Nco-3) of the user equipment UE11 to the user equipment UE3. $H_2$ represents a channel matrix of a non-transmission node 2 of the user equipment UE11 (which is the transmission node of the user equipment UE2) and the user equipment UE11; and $H_3$ represents a channel matrix of a non-transmission node 3 of the user equipment UE11 (which is the transmission node of the user equipment UE3) and the user equipment UE11.

$$\sum_{i=2}^{3} H_i P_i t_i$$

are inter-cell interference signals caused by the non-transmission nodes 2 (Nco-2) and 3(Nco-3) of the user equipment UE11 in the cooperative node set Sco-1, which may be obtained by performing an interaction between the transmission node 1 (Nco-1) of the user equipment UE11 and the non-transmission nodes 2 (Nco-2) and 3 (Nco-3) of the user equipment UE11. $P_4$ represents a pre-coding vector employed in beamforming for the user equipment UE4 which is served by the cooperative node 4 (Nco-4) in the cooperative node set Sco-2 (which is a non-cooperative node set with respect to the cooperative node set Sco-1); and $P_5$ represents a pre-coding vector employed in beamforming for the user equipment UE5 which is served by the cooperative node 5 (Nco-5) in the cooperative node set Sco-2. $t_4$ represents a signal sent from the cooperative node 4 (Nco-4) to the user equipment UE4; and $t_5$ represents a signal sent from the cooperative node 5 (Nco-5) to the user equipment UE5.

$$\sum_{i=4}^{5} H_i P_i t_i$$

are interference signals caused by the cooperative nodes 4 (Nco-4) and 5 (Nco-5) in the non-cooperative node set Sco-2 (with respect to the cooperative node set Sco-1), which may be measured by the user equipment UE11 and fed back to the transmission node 1 (Nco-1) of the user equipment UE11 by the user equipment UE11. The noise signal $n_{UE11}$ of the user equipment UE11 is fed back to the transmission node 1 (Nco-1) of the user equipment UE11 by the user equipment UE11.

It is assumed that in the cooperation system shown in FIG. 4, a power assigned to the user equipment UE11 by the transmission node 1 (Nco-1) of the user equipment UE11 is represented as $P_{s11}$, a power assigned to the user equipment UE12 by the transmission node 1 (Nco-1) of the user equipment UE11 is represented as $P_{s12}$, and both of $P_{s11}$ and $P_{s12}$ may be obtained by the transmission node 1 (Nco-1) of the user equipment UE11 via the scheduling module thereof a power assigned to the user equipment UE2 by the non-transmission node 2 (Nco-2) of the user equipment UE11 is represented as $P_{s2}$, and a power assigned to the user equipment UE3 by the non-transmission node 3 (Nco-3) of the user equipment UE11 is represented as $P_{s3}$, a power assigned to the user equipment UE4 respectively by the cooperative node 4 (Nco-4) in the cooperative node set Sco-2 (which is a non-cooperative node set with respect to the cooperative node set Sco-1) is represented as $P_{s4}$, and a power assigned to the user equipment UE5 by the cooperative node 5 (Nco-5) in the cooperative node set Sco-2 is represented as $P_{s5}$; and $P_{s2}$ and $P_{s3}$ may be obtained by performing the interaction between the transmission node 1 (Nco-1) of the user equipment UE11 and the cooperative nodes 2 (Nco-2) and 3 (Nco-3).

Based on the above assumption, in the cooperation system shown in FIG. 4, the value $\gamma_{UE11}$ of the downlink channel quality information CQI of the downlink channel between the user equipment UE11 and the transmission node (Nco-1) of the user equipment UE11 may be expressed as:

$$\gamma_{UE11} = \frac{P_{s11}|w_{UE11}^H(H_{UE11}P_{UE11})|^2 / P'_{s11}}{P_{s12}|w_{UE11}^H(H_{UE11}P_{UE12})|^2 / P'_{s11} + \sum_{i=2}^{3} P_{si}|w_{UE11}^H(H_i P_i)|^2 / P'_{s11} + \sum_{i=4}^{5} P_{si}|w_{UE11}^H(H_i P_i)|^2 + n_{UE11}n_{UE11}^H}$$

$$= \frac{P_{s11}|w_{UE11}^H(H_{UE11}P_{UE11})|^2}{P_{s12}|w_{UE11}^H(H_{UE11}P_{UE12})|^2 + \sum_{i=2}^{3} P_{si}|w_{UE11}^H(H_i P_i)|^2 + \left(\sum_{i=4}^{5} P_{si}|w_{UE11}^H(H_i P_i)|^2 + n_{UE11}n_{UE11}^H\right) \cdot P'_{s11}}$$

In the above $\gamma_{UE11}$, the power S of received useful signal of the user equipment UE11 is $P_{s11}|w_{UE11}^H(H_{UE11}P_{UE11})|^2$; the inter-user interference power $I_{IUI}$ from the transmission node 1 (Nco-1) in the cooperative node set Sco-1 is $P_{s12}|w_{UE11}^H(H_{UE11}P_{UE12})|^2$; and the inter-cell interference power $I_{ICI}$ cause by the non-transmission nodes 2 (Nco-2) and 3 (Nco-3) of the user equipment UE11 in the cooperative node set Sco-1 is $$\sum_{i=2}^{3} P_{si}|w_{UE11}^H(H_i P_i)|^2.$$

However, in TDD format, uplink channel information obtained by measuring the uplink channel includes transmitting power information of a certain signal sent by the user equipment and used to measure the uplink channel. Therefore, before feeding back the received noise power N of the user equipment UE11 and the interference power I caused by the node in the non-cooperative node set Sco-2 (which is a non-cooperative node set with respect to the cooperative node set Sco-1), the user equipment UE11 needs to correct a sum (N+I) of the received noise power N (i.e. $n_{UE11}n_{UE11}^H$) of the user equipment UE11 and the interference power I caused by the node in the non-cooperative node set Sco-2 (which is a non-cooperative node set with respect to the cooperative node set Sco-1). A applied correction factor is the power $P_{s11}$' of the user equipment UE11 sending a certain uplink signal, where the certain uplink signal is used to measure the uplink channel information at the network side. The user equipment UE11 finally feeds back a value of corrected (N+I) to the transmission node 1 (Nco-1) in the cooperative node set Sco-1.

In another embodiment of the present invention, (N+I) may be also corrected by the transmission node 1 (Nco-1) in the cooperative node set Sco-1. That is, the user equipment UE11 feeds back $$\sum_{i=4}^{5} P_{si}|w_{UE11}^H(H_i P_i)|^2 + n_{UE11}n_{UE11}^H$$

and $P_{s11}$' to the transmission node 1 (Nco-1) in the cooperative node set Sco-1, and the transmission node 1 (Nco-1) in the cooperative node set Sco-1 calculates a product $$\left(\sum_{i=4}^{5} P_{si}|w_{UE11}^H(H_i P_i)|^2 + n_{UE11}n_{UE11}^H\right) \cdot P'_{s11}$$

of $$\sum_{i=4}^{5} P_{si}|w_{UE11}^H(H_i P_i)|^2 + n_{UE11}n_{UE11}^H$$

and $P_{s11}$' to correct (N+I).

In the above expression $P_{s11}|w_{UE11}^H(H_{UE11}P_{UE11})|^2$ of S, $w_{UE11}^H$ is a conjugate transpose of a receiver vector $w_{UE11}$ employed by the user equipment UE11; $H_{UE11}P_{UE11}$ represents an equivalent channel obtained by pre-coding a channel $H_{UE11}$ between the transmission node 1 (Nco-1) of the user equipment UE11 and the user equipment UE11 with $P_{UE11}$; $|w_{UE11}^H(H_{UE11}P_{UE11})|^2$ represents a channel gain obtained by passing the signal $s_{11}$ sent from the transmission node 1 (Nco-1) of the user equipment UE11 to the user equipment UE11 through the equivalent channel $H_{UE11}P_{UE11}$ and the receiver $w_{UE11}$. In the above expression $P_{s12}|w_{UE11}{}^H(H_{UE11}P_{UE12})|_2$ of $I_{IUI}$, $H_{UE11}P_{UE12}$ represents an equivalent channel obtained by pre-coding the channel $H_{UE11}$ between the transmission node 1 (Nco-1) of the user equipment UE11 and the user equipment UE11 with $P_{UE12}$; $|w_{UE11}{}^H(H_{UE11}P_{UE12})|^2$ represents a channel gain obtained by passing the signal $s_{12}$ sent from the transmission node 1 (Nco-1) to the user equipment UE12 through the equivalent channel $H_{UE11}P_{UE12}$ and the receiver $w_{UE11}$. In the expression $$\sum_{i=2}^{3} P_{si}|w_{UE11}^{H}(H_i P_i)|^2$$

of $I_{ICI}$, $H_iP_i$ represents an equivalent channel obtained by pre-coding a channel $H_i$ between the user equipment UE11 and the non-transmission node 2 (Nco-2) or between the user equipment UE11 and the non-transmission node 3 (Nco-3) of the user equipment UE11 with $P_i$; $|w_{UE11}{}^H(H_iP_i)|^2$ represents a channel gain, which is obtained by passing a signal $t_2$ sent from the non-transmission node 2 (Nco-2) of the user equipment UE11 to the user equipment UE2 or a signal $t_3$ sent from the non-transmission node 3 (Nco-3) of the user equipment UE11 to the user equipment UE3, through the equivalent channel $H_iP_i$ and the receiver $w_{UE11}$. In the above expression $$\left(\sum_{i=4}^{5} P_{si}|w_{UE11}^{H}(H_i P_i)|^2 + n_{UE11}n_{UE11}^{H}\right) \cdot P'_{s11},$$

$H_iP_i$ represents a equivalent channel obtained by pre-coding a channel $H_i$ between the user equipment UE11 and the cooperative node 4 (Nco-4) in the cooperative node set Sco-2 (which is a non-cooperative node set with respect to the cooperative node set Sco-1) or between the user equipment UE11 and the cooperative node 5 (Nco-5) in the cooperative node set Sco-2 with $P_i$; $|w_{UE11}{}^H(H_iP_i)|^2$ represents a channel gain, which is obtained by passing a signal $t_4$ sent from the cooperative node 4 (Nco-4) in the cooperative node set Sco-2 (which is a non-cooperative node set with respect to the cooperative node set Sco-1) to the user equipment UE4 or a signal $t_5$ sent from the cooperative node 5 (Nco-5) in the cooperative node set Sco-2 to the user equipment UE5, through the equivalent channel $H_iP_i$ and the receiver $w_{UE11}$.

Figure 5:
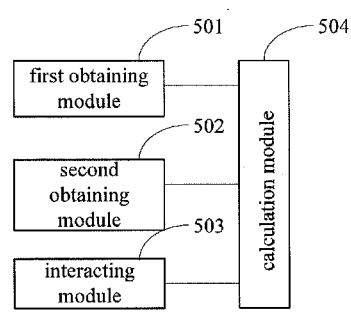
FIG. 5 is a schematic structural diagram of a device for obtaining downlink channel quality information according to an embodiment of the present invention.

Referring to FIG. 5, a schematic structural diagram of a device for obtaining downlink channel quality information is provided according to an embodiment of the present invention. Only portions relative to the embodiment of the present invention are shown for describing easily. As shown in FIG. 5, the device for obtaining the downlink channel quality information may be a transmission node of the network in a wireless communication system (such as, LTE), such as a base station. The device includes a first obtaining module 501, a second obtaining module 502, an interacting module 503 and a calculation module 504.

The first obtaining module 501 is configured to obtain a received noise power of user equipment UE11 and an interference power to the user equipment UE11 by a node in a non-cooperative node set.

The second obtaining module 502 is configured to obtain an inter-user interference power during a multi-user scheduling of the transmission node in the cooperative node set, and a power of received useful signal of the user equipment UE11.

The interacting module 503 is configured to obtain an interference power to the user equipment UE11 by a non-transmission node in the cooperative node set, by interacting with the non-transmission node in the cooperative node set.

The calculation module 504 is configured to calculate a ratio of the power of received useful signal to a sum of an interference source power and the received noise power of the user equipment UE11; and take the ratio as a value of the downlink channel quality information CQI of a downlink channel between the transmission node and the user equipment UE11, where the interference source power includes the inter-user interference power during the multi-user scheduling of the transmission node in the cooperative node set, the obtained interference power to the user equipment UE11 by the node in the non-cooperative node set, and the interference power to the user equipment UE11 by the non-transmission node in the cooperative node set.

It should be noted that, in the embodiment of the device for obtaining the downlink channel quality information, the division for the function modules is only an example. In an implementation, the above function may be assigned to be implemented by different function modules as required, for example, based on a configuration requirement of corresponding hardware or convenience for software implementation. That is, the inner structure of the device for obtaining the downlink channel quality information may be divided into different function modules, to implement all of or a part of the functions described above. Furthermore, in an implementation, function modules in the embodiment may be realized by a corresponding hardware or may be completed by performing a corresponding hardware by a corresponding software. For example, the aforementioned first obtaining module may be performing the above the acquisition of the received noise power of the user equipment UE11 and the interference power to the user equipment UE11 by the node in the non-cooperative node set, such as a first obtain device; and may be a general processor or other hardware equipment capable of executing a corresponding computer program to complete the above functions. For another example, the above interacting module may be hardware having a function of performing the above obtaining the interference power to the user equipment UE11 by the non-transmission node in the cooperative node set by interacting with the non-transmission node in the cooperative node set, such as an interactor; and may be a general processor or other hardware equipment capable of executing a corresponding computer program to complete the above functions (each of the embodiments provided by the specification may apply the principle described above).

Figure 6:
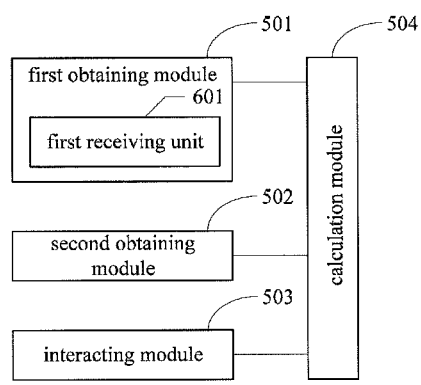
FIG. 6 is a schematic structural diagram of a device for obtaining downlink channel quality information according to another embodiment of the present invention.

A device for obtaining downlink channel quality information according to another embodiment of the invention is shown in FIG. 6, in which the first obtaining module 501 shown in FIG. 5 may include a first receiving unit 601. The first receiving unit 601 is configured to receive an interference power to the user equipment UE11 by P nodes in the non-cooperative node set, and a received noise power $n_{UE11}n_{UE11}{}^H$ of the user equipment UE11, where both of the interference power to the user equipment UE11 by P nodes in the non-cooperative node set and the received noise power of the user equipment UE11 are fed back by the user equipment UE11. The interference power to the user equipment UE11 by the node in the non-cooperative node set is $$\sum_{p=1}^{P}\sum_{q=1}^{Q_p} P_{Non\_s\_pq}|w_{UE11}^H(H_{Non\_p}P_{Non\_pq})|^2,$$

in which $H_{Non\_p}$ is a channel matrix of an arbitrary node $N_{Non\_p}$ in the P nodes of the non-cooperative node set and the user equipment UE11, $P_{Non\_pq}$ is a pre-coding vector employed in beamforming for user equipment $UE_{Non\_pq}$ which is served by the arbitrary node $N_{Non\_p}$ in the P nodes of the non-cooperative node set, $w_{UE11}^H$ is a conjugate transpose of a receiver vector $w_{UE11}$ of the user equipment UE11, $P_{Non\_s\_pq}$ is a power assigned to the user equipment $UE_{Non\_pq}$ by the arbitrary node $N_{Non\_p}$ in the P nodes of the non-cooperative node set, $$\sum_{q=1}^{Q_p} P_{Non\_s\_pq}|w_{UE11}^H(H_{Non\_p}P_{Non\_pq})|^2$$

is an interference power to the user equipment UE11 by the arbitrary node $N_{Non\_p}$ in the P nodes of the non-cooperative node set, where q is in a range of 1, 2, ..., $Q_p$, and $Q_p$ is a nature number. The value of $Q_p$ represents the number of user equipment served by the arbitrary node $N_{Non\_p}$ in the P nodes of the non-cooperative node set. The user equipment $UE_{Non\_pq}$ is different from the user equipment UE11 and UE1j, and UE1j represents other user equipment except the user equipment UE11 in the user equipment served by the transmission node in the cooperative node set.

Figure 7A:
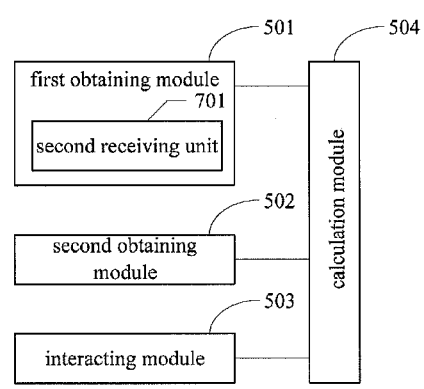
FIG. 7a is a schematic structural diagram of a device for obtaining downlink channel quality information according to another embodiment of the present invention.

A device for obtaining downlink channel quality information according to another embodiment of the invention is shown in FIG. 7a, in which the first obtaining module 501 shown in FIG. 5 may further include a second receiving unit 701. The second receiving unit 701 is configured to receive a corrected value $$P'_{s11}\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right)$$

of a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of the obtained interference power $$\sum_{p=1}^{P}\sum_{q=1}^{Q_p} P_{Non\_s\_pq}|w_{UE11}^H(H_{Non\_p}P_{Non\_pq})|^2$$

to the user equipment UE11 by the P nodes in the non-cooperative node set and the received noise power $n_{UE11}n_{UE11}^H$ of the user equipment UE11, where both of the interference power to the user equipment UE11 by the P nodes in the non-cooperative node set and the received noise power of the user equipment UE11 are fed back by the user equipment UE11. Particularly, $P_{Non\_s\_pq}$ is a power assigned to user equipment $UE_{Non\_pq}$ by an arbitrary node $N_{Non\_p}$ in the P nodes of the non-cooperative node set.

$$\sum_{q=1}^{Q_p} P_{Non\_s\_pq}|w_{UE11}^H(H_{Non\_p}P_{Non\_pq})|^2$$

is the interference power to the user equipment UE11 by the arbitrary node $N_{Non\_p}$ in the P nodes of the non-cooperative node set, where q is in a range of 1, 2, ..., $Q_P$, and $Q_p$ is a nature number, and the value of $Q_P$ represents the number of user equipment served by the arbitrary node $N_{Non\_p}$ in the P nodes of the non-cooperative node set. $P_{s11}'$ is a power of a certain signal which is sent by the user equipment UE11 and used to measure an uplink channel at the network side. $H_{Non\_p}$ is a channel matrix of the arbitrary node $N_{Non\_p}$ in the P nodes of the non-cooperative node set and the user equipment UE11. $P_{Non\_pq}$ is a pre-coding vector employed in beamforming for the user equipment $UE_{Non\_pq}$ which is served by the arbitrary node $N_{Non\_p}$ in the P nodes of the non-cooperative node set. The user equipment $UE_{Non\_pq}$ is different from the user equipment UE11 and UE1j, and UE1j represents other user equipment except the user equipment UE11 in the user equipment served by the transmission node in the cooperative node set.

Figure 7B:
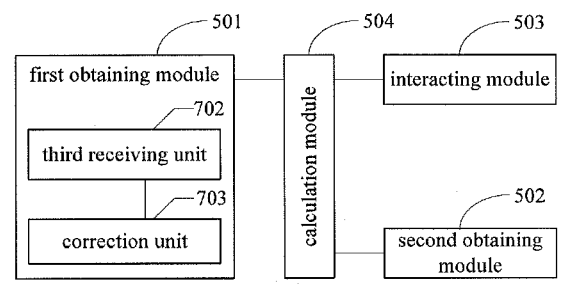
FIG. 7b is a schematic structural diagram of a device for obtaining downlink channel quality information according to another embodiment of the present invention.

A device for obtaining downlink channel quality information according to another embodiment of the invention is shown in FIG. 7b, in which the first obtaining module 501 shown in FIG. 5 may further includes a third receiving unit 702 and a correction unit 703.

The third receiving unit 702 is configured to receive $P_{s11}'$ and a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of the obtained interference power $$\sum_{p=1}^{P}\sum_{q=1}^{Q_p} P_{Non\_s\_pq}|w_{UE11}^H(H_{Non\_p}P_{Non\_pq})|^2$$

to the user equipment UE11 by the P nodes in the non-cooperative node set and the received noise power $n_{UE11}n_{UE11}^H$ of the user equipment UE11, where both of the interference power to the user equipment UE11 by the P nodes in the non-cooperative node set and the received noise power of the user equipment UE11 are fed back by the user equipment UE11.

$$\sum_{q=1}^{Q_p} P_{Non\_s\_pq}|w_{UE11}^H(H_{Non\_p}P_{Non\_pq})|^2$$

is the interference power to the user equipment UE11 by an arbitrary node $N_{Non\_p}$ in the P nodes of the non-cooperative node set, where q is in a range of 1, 2, ... $Q_p$, $Q_p$, is a natural number, and the value of $Q_p$ represents the number of user equipment served by the arbitrary node $N_{Non\_p}$ in the P nodes of the non-cooperative node set. $P_{Non\_s\_pq}$ is a power assigned to user equipment $UE_{Non\_pq}$ by the arbitrary node $N_{Non\_p}$ in the P nodes of the non-cooperative node set. $P_{s11}'$ is a power of a certain signal which is sent by the user equipment UE11 and used to measure an uplink channel at the network side. $H_{Non\_p}$ is a channel matrix of the arbitrary node $N_{Non\_p}$ in the P nodes of the non-cooperative node set and the user equipment UE11. $P_{Non\_pq}$ is a pre-coding vector employed in beamforming for the user equipment $UE_{Non\_pq}$ which is served by the arbitrary node $N_{Non\_p}$ in the P nodes of the non-cooperative node set. The user equipment $UE_{Non\_pq}$ is one of the user equipment served by the arbitrary node $N_{Non\_p}$ in the P nodes of the non-cooperative node set, which is obviously different from the user equipment served by the transmission node in the cooperative node set, such as the user equipment UE11 and a user equipment UE1j, where UE1j represents other user equipment except the user equipment UE11 in the user equipment served by the transmission node in the cooperative node set. $w_{UE11}{}^H$ is a conjugate transpose of $w_{UE11}$. $w_{UE11}$ is a receiver vector of the user equipment UE11. The form of the receiver is related to a type of the receiver used by the user equipment UE11, which will not be limited herein.

The correction unit 703 is configured to correct $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

with $P_{s11}'$, that is, calculate a product of $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

and $P_{s11}'$ to obtain a corrected value $$P_{s11}'\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right).$$

Figure 8:
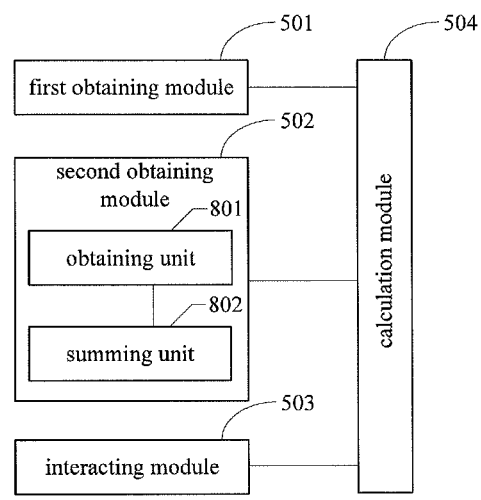
FIG. 8 is a schematic structural diagram of a device for obtaining downlink channel quality information according to another embodiment of the present invention.

A device for obtaining downlink channel quality information according to another embodiment of the invention is shown in FIG. 8, in which the second obtaining module 502 shown in FIG. 5 may include an obtaining unit 801 and a summing unit 802.

The obtaining unit 801 is configured to obtain $P_{S11}$, $H_{UE11}$, $n_{UE11}$, $P_{S1j}$, $P_{UE1j}$ and $P_{UE11}$ by a scheduler, where $P_{S11}$ is a power assigned to the user equipment UE11 by the transmission node, $H_{UE11}$ is a channel matrix of the user equipment UE11 and the transmission node, $n_{UE11}$ is a reception noise signal of the user equipment UE11, $P_{S1j}$ is a power assigned to user equipment $UE_{1j}$ by the transmission node, $P_{UE1j}$ is a pre-coding vector employed when the transmission node performs beamforming on the user equipment $UE_{1j}$, and $P_{UE11}$ is a pre-coding vector employed when the transmission node performs beamforming on the user equipment UE11. The user equipment $UE_{11}$ differs from the user equipment $UE_{1j}$, where j is in a range of 2, 3, . . . , J, and J is a natural number.

The summing unit is configured to calculate values of $P_{s11}|w_{UE11}{}^H(H_{UE11}P_{UE11})|^2$ and $$\sum_{j=2}^{J} P_{S1j}|w_{UE11}^H(H_{UE11}P_{UE1j})|^2,$$

where $P_{s11}|w_{UE11}{}^H(H_{UE11}P_{UE11})|^2$ represents the power of received useful signal of the user equipment UE11 and $$\sum_{j=2}^{J} P_{S1j}|w_{UE11}^H(H_{UE11}P_{UE1j})|^2$$

represents the inter-user interference power during the multi-user scheduling of the transmission node in the cooperative node set, and $w_{UE11}{}^H$ is a conjugate transpose of a receiver vector $w_{UE11}$ of the user equipment UE11.

Figure 9:
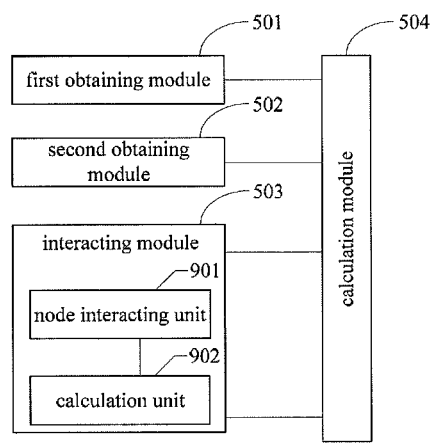
FIG. 9 is a schematic structural diagram of a device for obtaining downlink channel quality information according to another embodiment of the present invention.

A device for obtaining downlink channel quality information according to another embodiment of the invention is shown in FIG. 9, in which the interacting module 503 shown in FIG. 5 may further include a node interacting unit 901 and a calculation unit 90.

The node interacting unit 901 is configured to obtain $P_{s\_km}$, $H_k$ and $P_{km}$ by interacting with K non-transmission nodes in the cooperative node set, where $P_{s\_km}$ is a power assigned to user equipment UEco_km by an arbitrary non-transmission node $N_k$ in the K non-transmission nodes of the cooperative node set, $H_k$ is a channel matrix of the arbitrary non-transmission node $N_k$ in the K non-transmission nodes of the cooperative node set and the user equipment UE11, $P_{km}$ is a pre-coding vector employed in beamforming for the user equipment UEco_km which is served by the arbitrary non-transmission node $N_k$ in the K non-transmission nodes of the cooperative node set, the user equipment UEco_km is one of $M_k$ user equipment served by the arbitrary non-transmission node $N_k$ in the K non-transmission nodes of the cooperative node set, which is obviously different from the user equipment served by the transmission node in the cooperative node set, for example, different from the user equipment UE11 and the user equipment UE1j. Herein, UE1j represents other user equipment expect the user equipment UE11, in the user equipment served by the transmission node in the cooperative node set. m is in a range of 1, 2, . . . , $M_k$, and $M_k$ is a natural number. The value of m represents the number of user equipment served by the arbitrary non-transmission node $N_k$ in the K non-transmission nodes of the cooperative node set.

The calculation unit 802 is configured to calculate $$\sum_{k=1}^{K}\sum_{m=1}^{M_k} P_{s\_km}|w_{UE11}^H(H_k P_{km})|^2$$

as an interference power to the user equipment UE11 by the K non-transmission nodes in the cooperative node set, wherein $$\sum_{m=1}^{M_k} P_{s\_km}|w_{UE11}^H(H_k P_{km})|^2$$

is an interference power to the user equipment UE11 by the arbitrary non-transmission node $N_k$ in the K non-transmission nodes of the cooperative node set.

It should be noted that, a technical effect as a result of a content, such as a information interaction and a implementation, between the above modules/units of the device is the same as that of the embodiment of the present invention since the above modules/units of the device and the embodiment of the present invention are based on the same conception, and the specific content may refer to the description in the embodiments of the invention and will not be described herein.

It may be understood by those skilled that, all of or a part of steps in the various methods according to the above embodiments may be completed in a manner that a program instructs related hardware, such as one or more or all of the following methods:

obtaining, by a transmission node in a cooperative node set, a received noise power of user equipment UE11, and an interference power to the user equipment UE11 by a node in a non-cooperative node set;

obtaining, by the transmission node in the cooperative node set, an inter-user interference power during a multi-user scheduling of the transmission node in the cooperative node set, and a power of received useful signal of the user equipment UE11;

obtaining, by the transmission node in the cooperative node set, an interference power to the user equipment UE11 by a non-transmission node in the cooperative node set, by interacting with the non-transmission node in the cooperative node set; and calculating a ratio of the power of received useful signal to a sum of an interference source power and the received noise power of the user equipment UE11, as a value of the downlink channel quality information CQI of a downlink channel between the transmission node and the user equipment UE11, wherein the interference source power includes the inter-user interference power during the multi-user scheduling of the transmission node in the cooperative node set, the obtained interference power to the user equipment UE11 by the node in the non-cooperative node set and the interference power to the user equipment UE11 by the non-transmission node in the cooperative node set.

It may be understood by those skilled in the art that, all of or a part of steps in the various methods according to the above embodiments may be implemented in a manner that a program instructs related hardware, the program may be stored in a computer readable storage medium, such as a Read Only Memory (ROM), a Random Access Memory (RAM), a magnetic disk or optical disk.

In the above, a method and device for obtaining quality information of a downlink channel according to the embodiments of the present invention is described in detail. Specific examples are applied to describe the principle and embodiments of the present invention herein, and the description of the above embodiments is only used for helping to understand the method and core conception of the present invention; moreover, for those skilled in the art, there may be changes on the embodiments and the application range in light of the conception of the present invention. In summary, the content of the specification should not be understood as limiting the present invention.

What is claimed is:

1. A method for obtaining downlink channel quality information, the method comprising:

obtaining, by a transmission node in a cooperative node set, a received noise power of a user equipment, and obtaining, by the transmission node in the cooperative node set, a power of interference to the user equipment from a node in a non-cooperative node set;

obtaining, by the transmission node in the cooperative node set, an inter-user interference power during a multi-user scheduling of the transmission node in the cooperative node set, and a power of useful signal received at the user equipment;

obtaining, by the transmission node in the cooperative node set, a power of interference to the user equipment from a non-transmission node in the cooperative node set, by interacting with the non-transmission node in the cooperative node set; and calculating a ratio of the power of received useful signal to a sum of an interference source power and the received noise power of the user equipment, the ratio being taken as a value of the downlink channel quality information (CQI) of a downlink channel between the transmission node and the user equipment, wherein the interference source power comprises the inter-user interference power during the multi-user scheduling of the transmission node in the cooperative node set, the power of interference to the user equipment from the node in the non-cooperative node set, and the power of interference to the user equipment from the non-transmission node in the cooperative node set.

2. The method according to claim 1, wherein the obtaining, by the transmission node in the cooperative node set, the received noise power of the user equipment and the power of interference to the user equipment from the node in the non-cooperative node set comprises:

receiving power of interference to the user equipment from P nodes in the non-cooperative node set, and the received noise power $n_{UE11}n_{UE11}^{H}$ of the user equipment, wherein both of the power of interference to the user equipment from P nodes in the non-cooperative node set and the received noise power of the user equipment are fed back by the user equipment, wherein the obtained power of interference to the user equipment from the node in the non-cooperative node set is $$\sum_{p=1}^{P}\sum_{q=1}^{Q_p} P_{Non\_s\_pq}|w_{UE11}^{H}(H_{Non\_p}P_{Non\_pq})|^2,$$

$w_{UE11}^{H}$ is a conjugate transpose of a receiver vector $w_{UE11}$ of the user equipment, $H_{Non\_p}$ is a channel matrix of an arbitrary node $N_{Non\_p}$ in the P nodes of the non-cooperative node set and the user equipment, $P_{Non\_pq}$ is a pre-coding vector employed in beamforming for another user equipment $UE_{Non_{13}pq}$ which is served by the arbitrary node $N_{Non_{13}p}$ in the P nodes of the non-cooperative node set, $P_{Non\_s\_pq}$ is a power assigned to the another user equipment $UE_{Non_{13}\_pq}$ by the arbitrary node $N_{Non\_p}$ in the P nodes of the non-cooperative node set, and $$\sum_{q=1}^{Q_p} P_{Non\_s\_pq}|w_{UE11}^{H}(H_{Non\_p}P_{Non\_pq})|^2$$

is a power of interference to the user equipment from the arbitrary node $N_{Non\_p}$ in the P nodes of the non-cooperative node set, wherein q is in a range of 1, 2, ..., $Q_p$.

3. The method according to claim 1, wherein the obtaining, by the transmission node in the cooperative node set, the received noise power of user equipment and the power of interference to the user equipment from the node in the non-cooperative node set comprises:
receiving a corrected value $$P'_{s11}\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right)$$

of a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of an obtained power of interference $$\sum_{p=1}^{P}\sum_{q=1}^{Q_p} P_{Non\_s\_pq}|w_{UE11}^H(H_{Non\_p}P_{Non\_pq})|^2$$

to the user equipment from P nodes in the non-cooperative node set, and the received noise power $n_{UE11}n_{UE11}^H$ of the user equipment, wherein both of the power of interference to the user equipment from the P nodes in the non-cooperative node set and the received noise power of the user equipment are fed back by the user equipment; and
wherein $P_{Non\_s\_pq}$ is a power assigned to another user equipment $UE_{Non\_pq}$ by an arbitrary node $N_{Non\_p}$ in the P nodes of the non-cooperative node set;

$$\sum_{q=1}^{Q_p} P_{Non\_s\_pq}|w_{UE11}^H(H_{Non\_p}P_{Non\_pq})|^2$$

is a power of interference to the user equipment from the arbitrary node $N_{Non\_p}$ in the P nodes of the non-cooperative node set, $P_{s11}$' is a power of a signal which is sent by the user equipment and used to measure an uplink channel at the network side; $H_{Non\_p}$ is a channel matrix of the arbitrary node $N_{Non\_p}$ in the P nodes of the non-cooperative node set and the user equipment; $P_{Non\_p}$ is a pre-coding vector employed in beamforming for the another user equipment $UE_{Non\_pq}$ which is served by the arbitrary node $N_{Non\_p}$ in the P nodes of the non-cooperative node set; wherein q is in a range of 1, 2, . . . , $Q_p$.

4. The method according to claim 1, wherein the obtaining, by the transmission node in the cooperative node set, the received noise power of the user equipment and the power of interference to the user equipment from the node in the non-cooperative node set comprises:
receiving $P_{s11}$' and a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of an obtained power of interference $$\sum_{p=1}^{P}\sum_{q=1}^{Q_p} P_{Non\_s\_pq}|w_{UE11}^H(H_{Non\_p}P_{Non\_pq})|^2$$

to the user equipment from P nodes in the non-cooperative node set and the received noise power $n_{UE11}n_{UE11}^H$ of the user equipment, where both of the power of interference to the user equipment from the P nodes in the non-cooperative node set and the received noise power of the user equipment are fed back by the user equipment; wherein $$\sum_{q=1}^{Q_p} P_{Non\_s\_pq}|w_{UE11}^H(H_{Non\_p}P_{Non\_pq})|^2$$

is a power of interference to the user equipment from an arbitrary node $N_{Non\_p}$ in the P nodes of the non-cooperative node set, $P_{Non\_s\_pq}$ is a power assigned to another user equipment $UE_{Non\_pq}$ by the arbitrary node $N_{Non\_p}$ in the P nodes of the non-cooperative node set; $P_{s11}$' is a power of a signal which is sent by the user equipment and used to measure an uplink channel at the network side; $H_{Non\_p}$ is a channel matrix of the arbitrary node $N_{Non\_p}$ in the P nodes of the non-cooperative node set and the user equipment; $P_{Non\_pq}$ is a pre-coding vector employed in beamforming for the another user equipment $UE_{Non\_pq}$ which is served by the arbitrary node $N_{Non\_p}$ in the P nodes of the non-cooperative node set; and wherein q is in a range of 1, 2, . . . $Q_p$; and
correcting $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

with $P_{s11}$' to obtain a corrected value $$P'_{s11}\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right).$$

5. The method according to claim 1, wherein the obtaining, by the transmission node in the cooperative node set, the inter-user interference power during the multi-user scheduling of the transmission node in the cooperative node set and the power of useful signal received at the user equipment comprises:
obtaining, by a scheduler, $P_{S11}$, $H_{UE11}$, $n_{UE11}$, $P_{S1j}$, $P_{UE1j}$ and $P_{UE11}$, wherein $P_{s11}$ is a power assigned to the user equipment by the transmission node, $H_{UE11}$ is a channel matrix between the user equipment and the transmission node, $n_{UE11}$ is a reception noise signal of the user equipment, $P_{S1j}$ is a power assigned to user equipment $UE_{1j}$ by the transmission node, $P_{UE1j}$ is a pre-coding vector employed when the transmission node performs beamforming on the user equipment $UE_{1j}$, and $P_{UE11}$ is a pre-coding vector employed when the transmission node performs beamforming on the user equipment, wherein the user equipment differs from the user equipment $UE_{1j}$; and calculating values of $P_{s11}|W_{UE11}{}^H(H_{UE11}P_{UE11})|^2$ and $$\sum_{j=2}^{J} P_{s1j}|w_{UE11}^H(H_{UE11}P_{UE1j})|^2,$$

wherein $P_{s11}|W_{UE11}{}^H(H_{UE11}P_{UE11})|_2$ represents the power of received useful signal of the user equipment and $$\sum_{j=2}^{J} P_{s1j}|w_{UE11}^H(H_{UE11}P_{UE1j})|^2$$

represents the inter-user interference power during the multi-user scheduling of the transmission node in the cooperative node set, and $W_{UE11}{}^H$ is a conjugate transpose of a receiver vector $w_{UE11}$ of the user equipment.

6. The method according to claim 1, wherein the obtaining, by the transmission node in the cooperative node set, the power of interference to the user equipment from the non-transmission node in the cooperative node set, by interacting with the non-transmission node in the cooperative node set comprises:

obtaining $P_{s\_km}$, $H_k$ and $P_{km}$ by interacting with K non-transmission nodes in the cooperative node set, wherein $P_{s\_km}$ is a power assigned to another user equipment UEco_km by an arbitrary non-transmission node $N_k$ in the K non-transmission nodes of the cooperative node set, $H_k$ is a channel matrix of the arbitrary non-transmission node $N_k$ in the K non-transmission nodes of the cooperative node set and the user equipment, $P_{km}$ is a pre-coding vector employed in beamforming for the another user equipment UEco_km which is served by one of the K non-transmission nodes in the cooperative node set, and m is in a range of 1, 2, . . . , $M_k$; and calculating $$\sum_{k=1}^{K}\sum_{m=1}^{M_k} P_{s\_lan}|w_{UE11}^H(H_k P_{km})|^2$$

as a power of interference to the user equipment from the K non-transmission nodes in the cooperative node set, wherein $$\sum_{m=1}^{M_k} P_{s\_km}|w_{UE11}^H(H_k P_{km})|^2$$

is a power of interference to the user equipment from the arbitrary non-transmission node $N_k$ in the K non-transmission nodes of the cooperative node set.

7. A device for obtaining downlink channel quality information, the device comprising:

one or more processors; and a memory storing program instructions that, when executed by the one or more processors, configure the device to:

obtain a received noise power of a user equipment, and obtain a power of interference to the user equipment from a node in a non-cooperative node set;

obtain an inter-user interference power during a multi-user scheduling of a transmission node in a cooperative node set, and obtain a power of useful signal received at the user equipment;

obtain a power of interference to the user equipment from a non-transmission node in the cooperative node set, by interacting with the non-transmission node in the cooperative node set; and calculate a ratio of the power of received useful signal to a sum of an interference source power and the received noise power of the user equipment, the ratio being taken as a value of the downlink channel quality information (CQI) of a downlink channel between the transmission node and the user equipment; wherein the interference source power comprises the inter-user interference power during the multi-user scheduling of the transmission node in the cooperative node set, the power of interference to the user equipment from the node in the non-cooperative node set, and the power of interference to the user equipment from the non-transmission node in the cooperative node set.

8. The device according to claim 7, wherein the obtaining the received noise power of the user equipment, and the obtaining the power of interference to the user equipment from the node in the non-cooperative node set comprises:

receiving a power of interference to the user equipment from P nodes in the non-cooperative node set, and the received noise power $n_{UE11}n_{UE11}{}^H$ of the user equipment, wherein both of the power of interference to the user equipment from P nodes in the non-cooperative node set and the received noise power of the user equipment are fed back by the user equipment, wherein the power of interference to the user equipment from the node in the non-cooperative node set is $$\sum_{p=1}^{P}\sum_{q=1}^{Q_p} P_{Non\_s\_pq}|w_{UE11}^H(H_{Non\_p}P_{Non\_pq})|^2,$$

$W_{UE11}{}^H$ is a conjugate transpose of a receiver vector $w_{UE11}$ of the user equipment, $H_{Non\_p}$ is a channel matrix of an arbitrary node $N_{Non\_p}$ in the P nodes of the non-cooperative node set and the user equipment, $P_{Non\_pq}$ is a pre-coding vector employed in beamforming for another user equipment $UE_{Non\_pq}$ which is served by the arbitrary node $N_{Non\_p}$ in the P nodes of the non-cooperative node set, $P_{Non\_s\_pq}$ is a power assigned to the another user equipment $UE_{Non\_pq}$ by the arbitrary node $N_{Non\_p}$ in the P nodes of the non-cooperative node set, and $$\sum_{q=1}^{Q_p} P_{Non\_s\_pq}|w_{UE11}^H(H_{Non\_p}P_{Non\_pq})|^2$$

is a power of interference to the user equipment from the arbitrary node $N_{Non\_p}$ in the P nodes of the non-cooperative node set, wherein q is in a range of 1, 2, . . . , $Q_p$.

9. The device according to claim 7, wherein the obtaining the received noise power of the user equipment, and the obtaining the power of interference to the user equipment from the node in the non-cooperative node set comprises:
receiving a corrected value $$P'_{s11}\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right)$$

of a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of an obtained power of interference $$\sum_{p=1}^{P}\sum_{q=1}^{Q_p} P_{Non\_s\_pq}|w_{UE11}^H(H_{Non\_p}P_{Non\_pq})|^2$$

to the user equipment from P nodes in the non-cooperative node set, and the received noise power $n_{UE11}n_{UE11}^H$ of the user equipment, wherein both of the power of interference to the user equipment from the P nodes in the non-cooperative node set and the received noise power of the user equipment are fed back by the user equipment; and wherein $P_{Non\_s\_pq}$ is a power assigned to another user equipment $UE_{Non\_pq}$ by an arbitrary node $N_{Non\_p}$ in the non-cooperative node set;

$$\sum_{q=1}^{Q_p} P_{Non\_s\_pq}|w_{UE11}^H(H_{Non\_p}P_{Non\_pq})|^2$$

is a power of interference to the user equipment from the arbitrary node $N_{Non\_p}$ in the P nodes of the non-cooperative node set, $P_{s11}$ 40 is a power of a signal which is sent by the user equipment and used to measure an uplink channel at the network side; $H_{Non\_p}$ is a channel matrix of the arbitrary node in the P nodes of the non-cooperative node set and the user equipment; $P_{Non\_pq}$ is a pre-coding vector employed in beamforming for the another user equipment $UE_{Non\_pq}$ which is served by the arbitrary node $N_{Non\_p}$ in the P nodes of the non-cooperative node set; wherein q is in a range of 1, 2, . . . , $Q_p$.

10. The device according to claim 7, wherein the obtaining the received noise power of the user equipment, and the obtaining the power of interference to the user equipment from the node in the non-cooperative node set comprises:
receiving $P_{s11}'$ and a sum $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

of an obtained power of interference $$\sum_{p=1}^{P}\sum_{q=1}^{Q_p} P_{Non\_s\_pq}|w_{UE11}^H(H_{Non\_p}P_{Non\_pq})|^2$$

to the user equipment from P nodes in the non-cooperative node set and the received noise power $n_{UE11}n_{UE11}^H$ of the user equipment, where both of the power of interference to the user equipment from the P nodes in the non-cooperative node set and the received noise power of the user equipment are fed back by the user equipment; wherein $$\sum_{q=1}^{Q_p} P_{Non\_s\_pq}|w_{UE11}^H(H_{Non\_p}P_{Non\_pq})|^2$$

is a power of interference to the user equipment from an arbitrary node $N_{Non\_p}$ in the P nodes of the non-cooperative node set, $P_{Non\_s\_pq}$ is a power assigned to another user equipment $UE_{Non\_pq}$ by the arbitrary node $N_{Non\_p}$ in the P nodes of the non-cooperative node set; $P_{s11}'$ is a power of a signal which is sent by the user equipment and used to measure an uplink channel at the network side; $H_{Non\_p}$ is a channel matrix of the arbitrary node $N_{Non\_p}$ in the P nodes of the non-cooperative node set and the user equipment; $P_{Non\_pq}$ is a pre-coding vector employed in beamforming for the another user equipment $UE_{Non\_pq}$ which is served by the arbitrary node $N_{Non\_p}$ in the P nodes of the non-cooperative node set; and wherein q is in a range of 1, 2, . . . $Q_p$; and correcting $$\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H$$

with $P_{s11}'$ to obtain a corrected value $$P'_{s11}\left(\sum_{p=1}^{P}\sum_{q=1}^{Q_p} P_{Non\_s\_pq}|w_{UE11}^H(H_{Non\_p}P_{Non\_pq})|^2 + n_{UE11}n_{UE11}^H\right).$$

11. The device according to claim 7, wherein the obtaining the inter-user interference power during the multi-user scheduling of the transmission node in the cooperative node set, and the obtaining the power of useful signal received at the user equipment comprises:
obtaining $P_{s11}$, $H_{UE\ 11}$, $n_{UE11}$, $P_{S1j}$, $P_{UE1j}$ and $P_{UE11}$ by a scheduler, wherein $P_{s11}$ is a power assigned to the user equipment by the transmission node, $H_{UE11}$ is a channel matrix of the user equipment and the transmission node, $n_{UE11}$ is a reception noise signal of the user equipment, $P_{S1j}$ is a power assigned to user equipment $UE_{1j}$ by the transmission node, $P_{UE1j}$ is a pre-coding vector employed when the transmission node performs beamforming on the user equipment $UE_{1j}$, and $P_{UE11}$ is a pre-coding vector employed when the transmission node performs the beamforming on the user equipment, wherein the user equipment differs from the user equipment $UE_{1j}$; and calculating values of $P_{s11}|w_{UE11}^H(H_{UE11}P_{UE11})|^2$ and $$\sum_{j=2}^{J} P_{s1j}|w_{UE11}^H(H_{UE11}P_{UE1j})|^2,$$

wherein $P_{s11}|w_{UE11}^H(H_{UE11}P_{UE11})|^2$ represents the power of received useful signal of the user equipment and $$\sum_{j=2}^{J} P_{s1j}|w_{UE11}^{H}(H_{UE11}P_{UE1j})|^2$$

represents the inter-user interference power during the multi-user scheduling of the transmission node in the cooperative node set, and $w_{UE11}^{H}$ is a conjugate transpose of a receiver vector $w_{UE}$ of the user equipment.

12. The device according to claim 7, wherein the obtaining the power of interference to the user equipment from the non-transmission node in the cooperative node set, by interacting with the non-transmission node in the cooperative node set comprises:

obtaining $P_{s\_km}$, $H_k$ and $P_{km}$ by interacting with K non-transmission nodes in the cooperative node set, wherein $P_{s\_km}$ is a power assigned to another user equipment UEco_km by an arbitrary non-transmission node $N_k$ in the K non-transmission nodes of the cooperative node set, $H_k$ is a channel matrix of the arbitrary non-transmission node $N_k$ in the K non-transmission nodes of the cooperative node set and the user equipment, $P_{km}$ is a pre-coding vector employed in beamforming for the another user equipment UEco_km which is served by one of the K non-transmission nodes in the cooperative node set, and m is in a range of 1,2, . . . , $M_k$; and calculating $$\sum_{k=1}^{K}\sum_{m=1}^{M_k} P_{s\_km}|w_{UE11}^{H}(H_k P_{km})|^2$$

as a power of interference to the user equipment from the K non-transmission nodes in the cooperative node set, wherein $$\sum_{m=1}^{M_k} P_{s\_km}|w_{UE11}^{H}(H_k P_{km})|^2$$

is a power of interference to the user equipment from the arbitrary non-transmission node $N_k$ in the K non-transmission nodes of the cooperative node set.

* * * * *